(12) United States Patent
Han et al.

(10) Patent No.: US 10,742,742 B2
(45) Date of Patent: Aug. 11, 2020

(54) ELECTRONIC APPARATUS, SYSTEM FOR INTERNET-OF-THINGS ENVIRONMENT AND CONTROL METHOD THEREOF

(71) Applicants: Samsung Electronics Co., Ltd., Gyeonggi-do (KR); Research & Business Foundation, Sungkyunkwan University, Gyeonggi-do (KR)

(72) Inventors: Sung-won Han, Seoul (KR); Ik-jun Yeom, Gyeonggi-do (KR); Young-seok Lee, Gyeonggi-do (KR); Chan-gue Jung, Gyeonggi-do (KR)

(73) Assignees: Samsung Electronics Co., Ltd (KR); Research & Business Foundation, Sungkyunkwan University (KR)

( * ) Notice: Subject to any disclaimer, the term of this patent is extended or adjusted under 35 U.S.C. 154(b) by 250 days.

(21) Appl. No.: 15/351,998

(22) Filed: Nov. 15, 2016

(65) Prior Publication Data

US 2017/0171317 A1    Jun. 15, 2017

(30) Foreign Application Priority Data

Dec. 15, 2015   (KR) .......................... 10-2015-0179582

(51) Int. Cl.
*H04L 29/08* (2006.01)
*H04L 12/911* (2013.01)
*H04L 29/12* (2006.01)
*H04W 4/70* (2018.01)

(52) U.S. Cl.
CPC .......... *H04L 67/125* (2013.01); *H04L 47/782* (2013.01); *H04L 61/1582* (2013.01); *H04L 61/303* (2013.01); *H04W 4/70* (2018.02)

(58) Field of Classification Search
CPC ............ G06F 17/30861; H04L 47/782; H04L 61/1582; H04L 61/303; H04L 67/125
See application file for complete search history.

(56) References Cited

U.S. PATENT DOCUMENTS

| | | | | |
|---|---|---|---|---|
| 9,320,020 | B2 * | 4/2016 | Wentink | H04W 8/26 |
| 9,876,862 | B1 * | 1/2018 | Lambert | H04L 67/16 |
| 10,020,957 | B2 * | 7/2018 | Kim | H04L 12/2838 |

(Continued)

*Primary Examiner* — Shean Tokuta
(74) *Attorney, Agent, or Firm* — The Farrell Law Firm, P.C.

(57) ABSTRACT

A first electronic apparatus is provided including a communicator configured to communicate with at least one among a plurality of electronic apparatuses respectively assigned with main resource identifiers for identifying the apparatuses over a network and a controller configured to assign a sub resource identifier, which corresponds to a main resource identifier of a second electronic apparatus and has a smaller unit size than the main resource identifier, to the second electronic apparatus, transmit the assigned sub resource identifier to the second electronic apparatus which the second electronic apparatus stores, use the assigned sub resource identifier of the second electronic apparatus to request communication with the second electronic apparatus, begin communication with the second electronic apparatus if the second electronic apparatus responds to the request for communication, and perform an operation of the second electronic apparatus based on a command from the first electronic apparatus.

17 Claims, 16 Drawing Sheets

(56) References Cited

U.S. PATENT DOCUMENTS

| | | | |
|---|---|---|---|
| 2010/0195655 A1 | 8/2010 | Jacobson et al. | |
| 2010/0208874 A1* | 8/2010 | Anupam | H04M 3/42 379/88.22 |
| 2011/0194485 A1* | 8/2011 | Horneman | H04W 72/042 370/315 |
| 2012/0284777 A1* | 11/2012 | Eugenio | H04W 4/70 726/4 |
| 2013/0142118 A1* | 6/2013 | Cherian | H04W 4/70 370/328 |
| 2013/0198340 A1* | 8/2013 | Ukkola | H04L 67/02 709/219 |
| 2014/0010177 A1* | 1/2014 | Wentink | H04W 8/26 370/329 |
| 2014/0330967 A1* | 11/2014 | Goto | H04L 43/08 709/224 |
| 2014/0351908 A1* | 11/2014 | Koeller | G06Q 30/02 726/6 |
| 2014/0372775 A1* | 12/2014 | Li | G06F 1/28 713/300 |
| 2015/0019624 A1* | 1/2015 | Jayakeerthy | H04L 67/14 709/203 |
| 2015/0032635 A1* | 1/2015 | Guise | G06Q 20/32 705/72 |
| 2015/0120924 A1 | 4/2015 | Scott et al. | |
| 2015/0149633 A1* | 5/2015 | Foti | H04L 67/30 709/226 |
| 2015/0271857 A1* | 9/2015 | Ribeiro | H04W 72/12 370/329 |
| 2015/0319727 A1* | 11/2015 | Guo | H04W 12/06 455/435.1 |
| 2016/0036764 A1* | 2/2016 | Dong | H04L 61/3025 370/254 |
| 2016/0054427 A1* | 2/2016 | Wirola | G01S 5/0236 342/451 |
| 2016/0100014 A1* | 4/2016 | Hsieh | H04W 76/10 709/208 |
| 2016/0103970 A1* | 4/2016 | Liu | G06Q 50/01 705/2 |
| 2016/0142873 A1* | 5/2016 | Trivedi | H04W 4/021 455/456.1 |
| 2016/0165663 A1* | 6/2016 | Shanmugam | H04W 76/10 370/338 |
| 2016/0234628 A1* | 8/2016 | Rahman | H04L 12/2809 |
| 2016/0278136 A1* | 9/2016 | Sorrentino | H04W 56/0015 |
| 2016/0285979 A1* | 9/2016 | Wang | H04L 67/16 |
| 2016/0380968 A1* | 12/2016 | Sarwar | H04W 88/16 709/245 |
| 2017/0006006 A1* | 1/2017 | Rawcliffe | H04L 67/10 |
| 2017/0046739 A1* | 2/2017 | Barak | G06Q 30/02 |
| 2017/0171690 A1* | 6/2017 | Kim | H04L 67/125 |

* cited by examiner

FIG. 8

| URI | /Building_A/Floor_B/Department_C/Office_D/temperature_4 |
|---|---|
| RESOURCE ACCESS ID | /25/61/78/81/04 |

(a) URI AND RESOURCE ACCESS ID

| RESOURCE ACCESS ID | URI |
|---|---|
| 04 | temperature_4 |
| 25 | Building_A |
| 61 | Floor_B |
| 78 | Department_C |
| 81 | Office_D |

(b) RESOURCE ACCESS TABLE

FIG. 9

(a) URI AND RESOURCE ACCESS ID

| URI | /Building_A/Floor_B/Department_C/Office_D/temperature_4 |
|---|---|
| RESOURCE ACCESS ID | /01/04 |

(b) RESOURCE ACCESS TABLE

| RESOURCE ACCESS ID | URI |
|---|---|
| 01 | Building_A/Floor_B/Department_C/Office_D |
| 04 | temperature_4 |
| 26 | motion |
| 62 | camera |
| 79 | alarm |

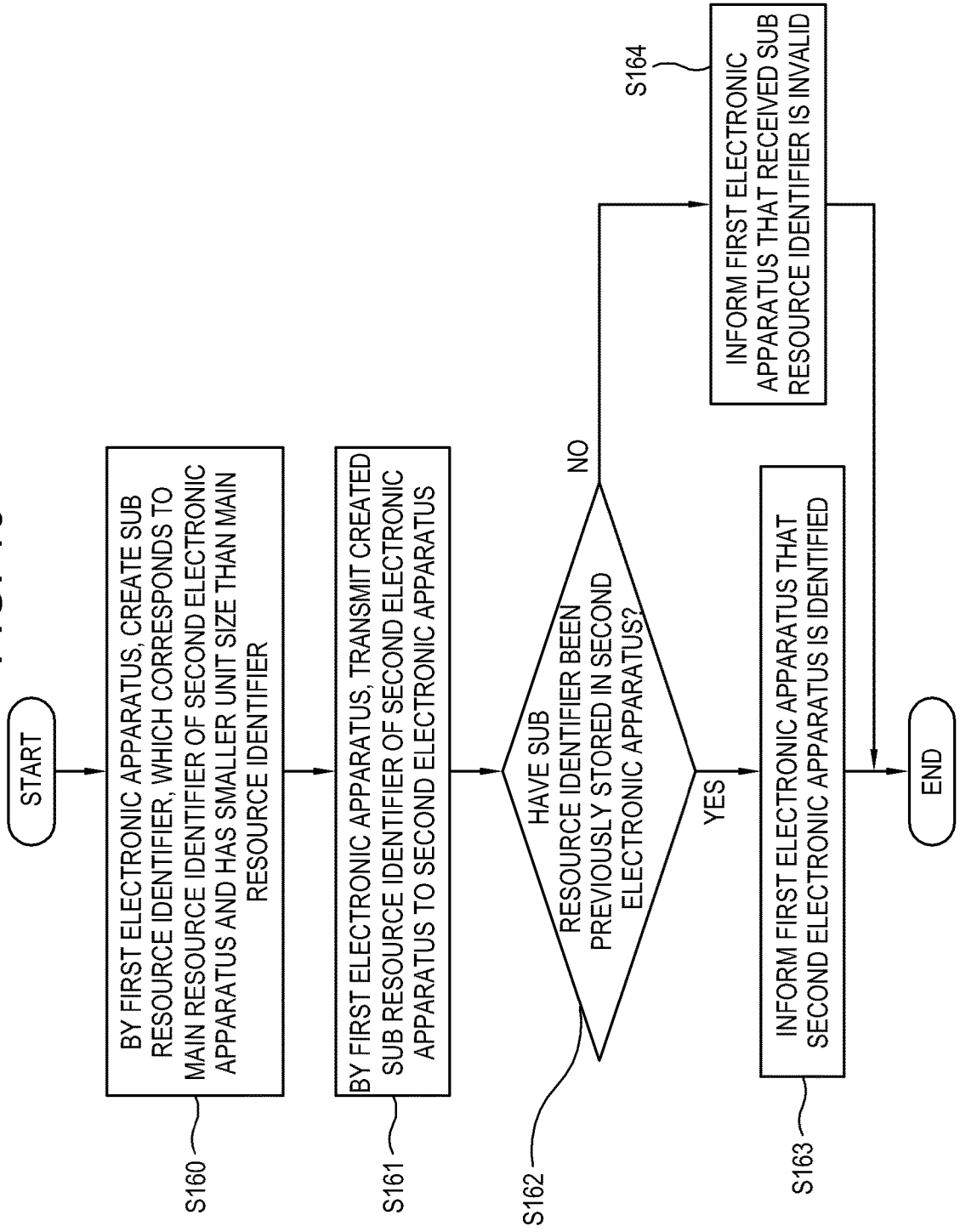

ELECTRONIC APPARATUS, SYSTEM FOR INTERNET-OF-THINGS ENVIRONMENT AND CONTROL METHOD THEREOF

PRIORITY

This application claims priority under 35 U.S.C § 119(a) to Korean Patent Application No. Serial No. 10-2015-0179582 which was filed on Dec. 15, 2015 in the Korean Intellectual Property Office, the entire disclosure of which is incorporated herein by reference.

BACKGROUND

1. Field of the Disclosure

The present disclosure generally relates to an electronic apparatus, a system for an Internet-of-Things environment and a control method thereof, and more particularly to an electronic apparatus, a system for an Internet-of-Things environment and a control method thereof, in which a resource identifier is used for communication between things in the Internet-of-Things environment.

2. Description of the Related Art

The existing Internet technology is a host-centric communication method of exchanging data by linking an Internet protocol (IP) address between two hosts, and is not suitable for the current Internet use pattern of repetitively making a request for popular content.

A content-centric networking (CCN) technology gives a uniform resource identifier (URI)-based resource identifier to data or information rather than the IP address, making it easier to request data and transfer the data.

In particular, the content-centric networking technology may be applied to an Internet of Things (IOT) environment in order to identify things from a simple sensor and controller to a smart home, a vehicle, a robot and the like having more complicated and various functions.

However, the URI-based resource identifier has shortcomings that it is variable and unnecessarily long in accordance with information. Further, the long resource identifier causes problems of wasting network capacity and thus decreasing data transfer efficiency.

SUMMARY

Accordingly, an aspect of the present disclosure provides an electronic apparatus, a system for an Internet-of-Things environment and a control method thereof, in which a short and invariable resource identifier is used for identifying a plurality of electronic apparatuses in the Internet-of-Things environment.

According to another aspect of the present disclosure, an electronic apparatus, a system for an Internet-of-Things environment and a control method thereof are provided, in which a short and invariable resource identifier is transmitted and received to improve efficiency of data transmission for communication between the plurality of electronic apparatuses in the Internet-of-Things environment.

According to another aspect of the present disclosure, a first electronic apparatus is provided, which includes a communicator configured to communicate with at least one among a plurality of electronic apparatuses respectively assigned with main resource identifiers for identifying the apparatuses over a network, and a controller configured to assign a sub resource identifier, which corresponds to a main resource identifier of a second electronic apparatus among the plurality of electronic apparatuses and has a smaller unit size than the main resource identifier, to the second electronic apparatus, transmit the assigned sub resource identifier to the second electronic apparatus which the second electronic apparatus stores, use the assigned sub resource identifier of the second electronic apparatus to request communication with the second electronic apparatus, begin communication with the second electronic apparatus if the second electronic apparatus responds to the request for the communication, and perform an operation relating to the second electronic apparatus based on a command from the first electronic apparatus.

According to this exemplary embodiment, a short and invariable resource identifier is used instead of a URI-based long and variable resource identifier when the plurality of electronic apparatuses communicate with each other in the Internet-of-Things environment, thereby having an effect on decreasing the size of packet exchanged for communication between the electronic apparatuses. Further, it is also possible to improve an efficiency of data transfer between the electronic apparatuses.

The controller may transmit the assigned sub resource identifier to the second electronic apparatus to make a request for communication start to the second electronic apparatus. Thus, to communicate with a destination electronic apparatus, the short and invariable resource identifier is transmitted instead of the URI of the destination electronic apparatus, thereby identifying the destination electronic apparatus.

The first electronic apparatus may further comprise a storage, and the controller may control the storage to store the main resource identifier of the second electronic apparatus and the sub resource identifier assigned to the second electronic apparatus. Thus, for repetitive communication with the destination electronic apparatus, the short and invariable resource identifier is tabulated in the table corresponding to the URI of the destination electronic apparatus, and the stored resource identifier is used in communication with the destination electronic apparatus in the future.

The main resource identifier may comprise a plurality of hierarchical items indicating at least one of positions and functions of the plurality of electronic apparatuses. Thus, the URI, where positions and functions of the electronic apparatuses are hierarchically represented, is used to identify the plurality of electronic apparatuses in the Internet-of-Things environment.

The sub resource identifier may be created corresponding to at least one among the plurality of hierarchical items included in the main resource identifier. Thus, the short and invariable resource identifier may be created corresponding to a part or the whole of the hierarchically represented URI.

The main resource identifier of the second electronic apparatus may be stored in a server, and provided to the first electronic apparatus if a search request is made to the server. Thus, the URI of the destination electronic apparatus may be previously registered and stored in the server, and provided in response to the request from the server.

According to another aspect of the present disclosure, a second electronic apparatus is provided which includes a communicator configured to communicate with at least one among a plurality of electronic apparatuses respectively assigned with main resource identifiers for identifying the apparatus over a network, and a controller configured to receive a sub resource identifier, which corresponds to the main resource identifier of the second electronic apparatus and has a smaller unit size than the main resource identifier, from the first electronic apparatus among the plurality of electronic apparatuses, store the received sub resource identifier corresponding to the main resource identifier of the second electronic apparatus, respond to a request for communication from the first electronic apparatus based on the stored sub resource identifier, and perform an operation based on a command from the first electronic apparatus when the communication with the first electronic apparatus begins.

According to this exemplary embodiment, a short and invariable resource identifier is used instead of a URI-based long and variable resource identifier when the plurality of electronic apparatuses communicate with each other in the Internet-of-Things environment, thereby having an effect on decreasing the size of packet exchanged for communication between the electronic apparatuses. Further, it is also possible to improve an efficiency of data transfer between the electronic apparatuses.

The controller may receive the sub resource identifier of the second electronic apparatus for request for the communication start from the first electronic apparatus, and may inform the first electronic apparatus that the communication start is possible if the received sub resource identifier has been previously stored. Thus, it is checked whether the short and invariable resource identifier transmitted from the source electronic apparatus has been previously stored when the source electronic apparatus makes a request for communication, and the communication with the source electronic apparatus is possible if there is a previously stored resource identifier.

The controller may inform the first electronic apparatus that the received sub resource identifier is invalid if the received sub resource identifier has been not previously stored. Thus, if the short and invariable resource identifier transmitted from the source electronic apparatus has been not previously stored, it is determined as an invalid resource identifier, thereby preventing communication with the source electronic apparatus.

The main resource identifier may comprise a plurality of hierarchical items indicating at least one of positions and functions of the plurality of electronic apparatuses. Thus, the URI, where positions and functions of the electronic apparatuses are hierarchically represented, is used to identify the plurality of electronic apparatuses in the Internet-of-Things environment.

The sub resource identifier may be created corresponding to at least one among the plurality of hierarchical items included in the main resource identifier. Thus, the short and invariable resource identifier may be created corresponding to a part or the whole of the hierarchically represented URI.

The main resource identifier of the second electronic apparatus may be stored in a server, and provided to at least one of the plurality of electronic apparatuses if a search request is made to the server. Thus, the URI of the electronic apparatus may be previously registered and stored in the server, and provided to another electronic apparatus in response to the request from the server.

According to another aspect of the present disclosure, a method is provided for controlling a first electronic apparatus, the method includes assigning a sub resource identifier, which corresponds to a main resource identifier of a second electronic apparatus among the plurality of electronic apparatuses assigned with the main resource identifiers for identifying the apparatuses over a network and has a smaller unit size than the main resource identifier, to the second electronic apparatus, and transmitting the assigned sub resource identifier to the second electronic apparatus which the second electronic apparatus stores, using the assigned sub resource identifier of the second electronic apparatus to request communication with the second electronic apparatus, beginning communication with the second electronic apparatus if the second electronic apparatus responds to the request for communication, and performing an operation of the second electronic apparatus based on a command from the first electronic apparatus.

According to this exemplary embodiment, a short and invariable resource identifier is used instead of a URI-based long and variable resource identifier when the plurality of electronic apparatuses communicate with each other in the Internet-of-Things environment, thereby having an effect on decreasing the size of packet exchanged for communication between the electronic apparatuses. Further, it is also possible to improve an efficiency of data transfer between the electronic apparatuses.

The making the request for the communication start to the second electronic apparatus may comprise transmitting the assigned sub resource identifier to the second electronic apparatus. Thus, to communicate with a destination electronic apparatus, the short and invariable resource identifier is transmitted instead of the URI of the destination electronic apparatus, thereby identifying the destination electronic apparatus.

The method may further comprise, by the first electronic apparatus, storing the main resource identifier of the second electronic apparatus and the sub resource identifier assigned to the second electronic apparatus. Thus, for repetitive communication with the destination electronic apparatus, the short and invariable resource identifier is tabulated in the table corresponding to the URI of the destination electronic apparatus, and the stored resource identifier is used in communication with the destination electronic apparatus in the future.

According to another aspect of the present disclosure, a method is provided for controlling a second electronic apparatus, the method includes receiving a sub resource identifier, which corresponds to the main resource identifier of the second electronic apparatus and has a smaller unit size than the main resource identifier, from the first electronic apparatus among the plurality of electronic apparatuses respectively assigned with main resource identifiers for identifying the apparatus over a network, storing the received sub resource identifier corresponding to the main resource identifier of the second electronic apparatus, responding to a request for communication from the first electronic apparatus based on the stored sub resource identifier, and performing an operation based on a command from the first electronic apparatus when the communication with the first electronic apparatus begins.

According to this exemplary embodiment, a short and invariable resource identifier is used instead of a URI-based long and variable resource identifier when the plurality of electronic apparatuses communicate with each other in the Internet-of-Things environment, thereby having an effect on decreasing the size of packet exchanged for communication between the electronic apparatuses. Further, it is also possible to improve an efficiency of data transfer between the electronic apparatuses.

The responding to the request for the communication start may comprise: receiving the sub resource identifier of the second electronic apparatus from the first electronic apparatus; and informing the first electronic apparatus that the communication start is possible if the received sub resource identifier has been previously stored. Thus, it is checked whether the short and invariable resource identifier transmitted from the source electronic apparatus has been previously stored when the source electronic apparatus makes a request for communication, and the communication with the source electronic apparatus is possible if there is a previously stored resource identifier. The method may further comprise informing the first electronic apparatus that the received sub resource identifier is invalid if the received sub resource identifier has been not previously stored. Thus, if the short and invariable resource identifier transmitted from the source electronic apparatus has been not previously stored, it is determined as an invalid resource identifier, thereby preventing communication with the source electronic apparatus.

According to another aspect of the present disclosure, a system is provided for an Internet-of-Things environment, including a first electronic apparatus configured to assign a sub resource identifier, which corresponds to a main resource identifier of a second electronic apparatus among a plurality of electronic apparatuses respectively assigned with main resource identifiers for identifying the apparatuses over a network and has a smaller unit size than the main resource identifier, to the second electronic apparatus, transmit the assigned sub resource identifier to the second electronic apparatus so that the second electronic apparatus may store the assigned sub resource identifier, use the assigned sub resource identifier of the second electronic apparatus to make a request for communication with the second electronic apparatus, begin communication with the second electronic apparatus if the second electronic apparatus responds to the request for the communication, and issue a command to the second electronic apparatus, and a second electronic apparatus configured to receive the assigned sub resource identifier of the second electronic apparatus from the first electronic apparatus, store the received sub resource identifier corresponding to the main resource identifier of the second electronic apparatus, respond to a request for communication from the first electronic apparatus based on the stored sub resource identifier, and perform an operation based on a command from the first electronic apparatus when the communication with the first electronic apparatus begins.

According to this exemplary embodiment, a short and invariable resource identifier is used instead of a URI-based long and variable resource identifier when the plurality of electronic apparatuses communicate with each other in the Internet-of-Things environment, thereby having an effect on decreasing the size of packet exchanged for communication between the electronic apparatuses. Further, it is also possible to improve an efficiency of data transfer between the electronic apparatuses.

According to another aspect of the present disclosure, a method is provided for controlling a system for an Internet-of-Things environment, the method includes, by a first electronic apparatus among a plurality of electronic apparatuses respectively assigned with main resource identifiers for identifying the apparatuses over a network, assigning a sub resource identifier, which corresponds to a main resource identifier of a second electronic apparatus and has a smaller unit size than the main resource identifier, to the second electronic apparatus, and transmitting the assigned sub resource identifier to the second electronic apparatus which the second electronic apparatus stores, by the first electronic apparatus, using the assigned sub resource identifier of the second electronic apparatus to request communication with the second electronic apparatus, by the second electronic apparatus, responding to the request for communication from the first electronic apparatus, beginning communication between the first electronic apparatus and the second electronic apparatus, and by the second electronic apparatus, performing an operation based on a command from the first electronic apparatus.

According to this exemplary embodiment, a short and invariable resource identifier is used instead of a URI-based long and variable resource identifier when the plurality of electronic apparatuses communicate with each other in the Internet-of-Things environment, thereby having an effect on decreasing the size of packet exchanged for communication between the electronic apparatuses. Further, it is also possible to improve an efficiency of data transfer between the electronic apparatuses.

BRIEF DESCRIPTION OF THE DRAWINGS

These and other aspects and features of the present disclosure will become apparent to those skilled in the art from the following detailed description, when taken in conjunction with the accompanying drawings, in which:

FIG. 8 is a table of short and invariable resource identifiers corresponding to a uniform resource identifier (URI) of an electronic apparatus according to an embodiment of the present disclosure;

FIG. 9 is a table of short and invariable resource identifiers corresponding to a URI of an electronic apparatus according to an embodiment of the present disclosure;

FIG. 16 is a flowchart of a method of controlling a system for the Internet-of-Things environment according to another embodiment of the present disclosure.

DETAILED DESCRIPTION

Below, embodiments of the present disclosure will be described with reference to accompanying drawings so that they may be realized by a person having an ordinary skill in the art. The present disclosure may be achieved in various forms and is not limited to the following embodiments. For convenience of description, parts not directly related to the present disclosure are omitted, and like numerals refer to like elements throughout.

Figure 1:
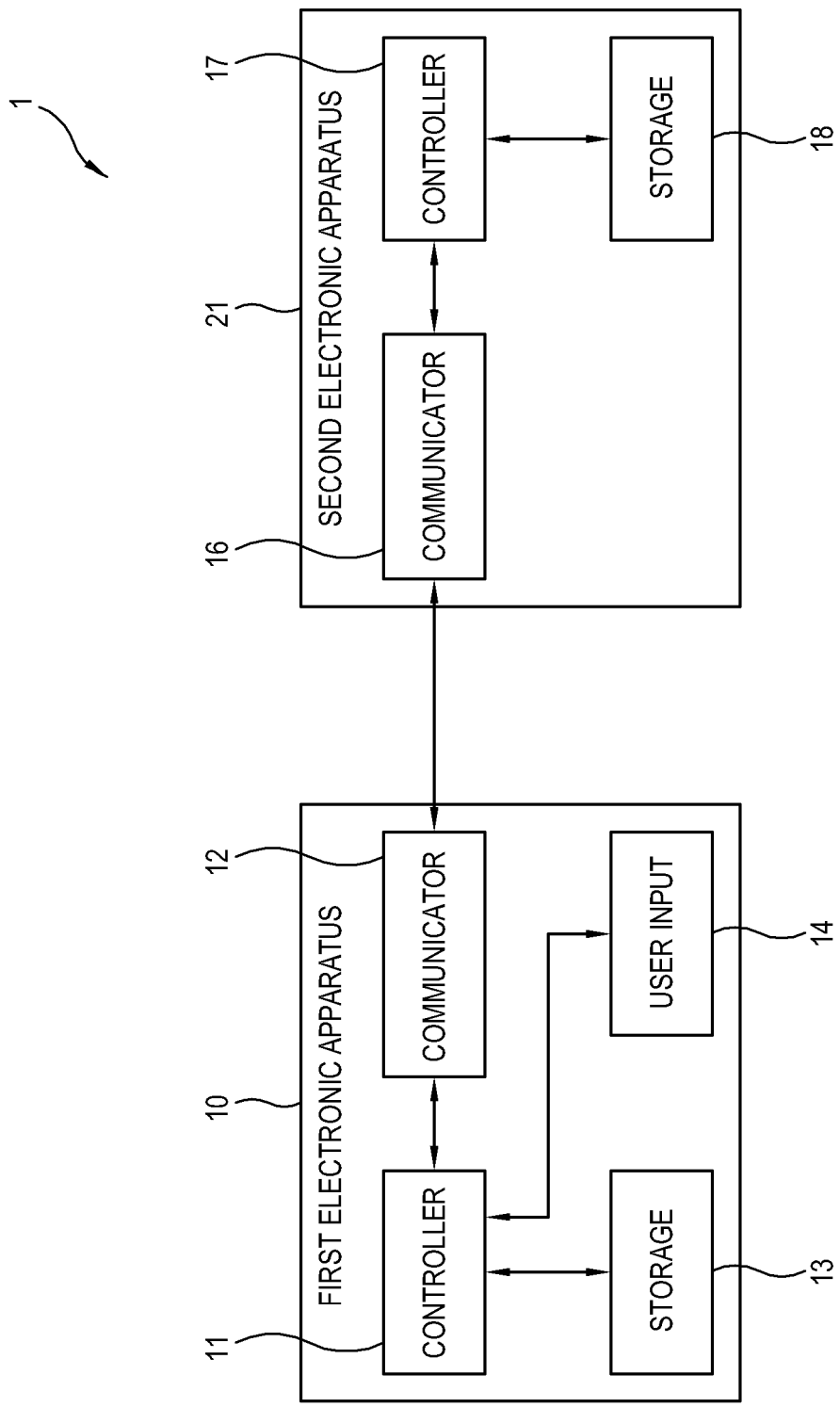
FIG. 1 is a block diagram of a system including a first electronic apparatus and a second electronic apparatus according to an embodiment of the present disclosure.

Electronic apparatuses and a system in an Internet-of-Things environment according to an embodiment of the present disclosure will be described with reference to FIG. 1. FIG. 1 is a block diagram of a first electronic apparatus, a second electronic apparatus and a system according to an embodiment of the present disclosure.

As shown in FIG. 1, a system 1 for an Internet-of-Things environment includes a first electronic apparatus 10 and a second electronic apparatus 21. The first electronic apparatus 10 includes a controller 11, a communicator 12, a storage 13 and a user input 14, and may be for example a boiler, a control device, a smart home, a robot, a vehicle, etc. Alternatively, the first electronic apparatus 10 may be a display apparatus such as a TV, a smart phone, a tablet computer, a desktop computer, a notebook computer, etc. Further, there are no limits to the kind of first electronic apparatus 10, and the first electronic apparatus 10 includes various kinds of electronic apparatus available in the Internet-of-Things environment. The elements of the first electronic apparatus 10 are not limited to the foregoing description, and may additionally include other elements.

The second electronic apparatus 21 includes a communicator 16, a controller 17 and a storage 18, and includes, for example, a refrigerator, a cleaner, a washing machine, an air conditioner and the like electronic apparatus, a temperature sensor, a camera, an alarm device, etc. Alternatively, the second electronic apparatus 21 includes a TV, a smart phone, a tablet computer, a notebook computer, a display apparatus and the like. Further, there are no limits to the kind of second electronic apparatus 21, and the second electronic apparatus 21 includes various kinds of electronic apparatus available in the Internet-of-Things environment. The elements of the second electronic apparatus 21 are not limited to the foregoing description, and may additionally include other elements.

The system 1 includes the first electronic apparatus 10 and the second electronic apparatus 21 with the foregoing elements, and uses a short and invariable resource identifier instead of a long and variable uniform resource identifier (URI) for access between the first electronic apparatus 10 and the second electronic apparatus 21 in the Internet-of-Things environment to thereby improve an efficiency of data transfer between the apparatuses.

The first electronic apparatus 10 gives the second electronic apparatus 21 among the plurality of electronic apparatuses, which are respectively assigned with main resource identifiers so that the apparatuses may be identified over a network, a sub resource identifier, which corresponds to the main resource identifier of the second electronic apparatus 21 and has a smaller unit size than the main resource identifier. The second electronic apparatus 21 stores the sub resource identifier received from the first electronic apparatus 10. The first electronic apparatus 10 makes a request for communication to the second electronic apparatus 21 through the sub resource identifier given to the second electronic apparatus 21, and begins communication with the second electronic apparatus 21 if the second electronic apparatus 21 responds to the request for the communication start. The first electronic apparatus 10 performs operations related to the second electronic apparatus 21 based on a command of the first electronic apparatus 10.

Among the elements of the first electronic apparatus 10, the communicator 12 communicates with at least one of the plurality of electronic apparatuses respectively assigned with the main resource identifiers for identifying the apparatuses over the network. The communicator 12 may connect with the communicator 16 of the second electronic apparatus 21 in order to perform communication with the second electronic apparatus 21. For example, the communicator 12 may communicate with the second electronic apparatus 21 by Bluetooth, ZigBee, low power wireless personal area network (6LoWPAN), a near field wireless communication method, etc. The communicator 12 may perform paring with the second electronic apparatus 21 when it uses Bluetooth for communication. Alternatively, the communicator 12 may connect with the second electronic apparatus 21 by Internet or the near field wireless communication.

The user input 14 may receive a user's input. The user input 14 may be in the form of an input panel or button placed on the first electronic apparatus 10. Further, if the first electronic apparatus 10 is a display apparatus, the user input 14 may be a touch screen, a keyboard, a mouse, etc. The user input 14 may receive a user's input through a remote controller. A user's input may include at least one of button clicking, menu selection, shortcut-key input, voice command, motion recognition, etc.

The controller 11 assigns the sub resource identifier, which corresponds to the main resource identifier of the second electronic apparatus 21 among the plurality of electronic apparatuses and has a smaller unit size than the main resource identifier, to the second electronic apparatus 21.

According to an embodiment of the present disclosure, the main resource identifier may include a plurality of hierarchical items which respectively indicates at least one of positions and functions of the plurality of electronic apparatuses in the Internet-of-Things environment. The main resource identifier may be a uniform resource identifier (URI) which is a unique address for identifying a resource over the Internet. For example, as shown in FIG. 8, if an electronic apparatus is a fourth temperature sensor at an office 'D' to be managed by a department 'C' on a floor 'B' in a building 'A,' the temperature sensor may be assigned a URI of '/Building_A/Floor_B/Department_C/Office_D/temperature_4'. The URI hierarchically indicates the information about the positions and the functions, and is easy to understand. However, the URI is long and becomes longer as information is added, and therefore the use of energy increases when a packet for identifying a resource using the URI is transferred.

As shown in (a) of FIG. 9, the temperature sensor may be assigned a resource access ID '/25/61/78/81/04' which is shorter than the URI. That is, the hierarchical items of 'Building_A', 'Floor_B', 'Department_C', 'Office_D' and 'temperature_4' divided by '/' in the URI of the temperature sensor are respectively converted into double digits of '25', '61', '78', '81' and '04', thereby generating a resource access ID which is shorter than the URI and invariable.

Thus, if the resource access ID, which is shorter than the URI and is invariable, is used to transfer a packet for identifying the resource, the size of the packet is decreased thereby improving efficiencies of energy use and data transfer.

According to an embodiment of the present disclosure, the sub resource identifier may be generated corresponding to at least one among the plurality of hierarchical items in the main resource identifier. For example, as shown in FIG. 9, if the electronic apparatus is a multifunctional sensor installed at an office 'D' to be managed by a department 'C' on a floor 'B' in a building 'A' and collecting data such as a temperature, a motion, a video, an alarm, etc., the multifunctional sensor may be assigned with a URI of '/Building_A/Floor_B/Department_C/Office_D/temperature_4' with respect to temperature data. Further, the multifunctional sensor may be assigned with a URI of '/Building_A/Floor_B/Department_C/Office_D/motion' with respect to motion data. Likewise, the multifunctional sensor may be assigned with a URI of '/Building_A/Floor_B/Department_C/Office_D/camera' with respect to video data, and a URI of '/Building_A/Floor_B/Department_C/Office_D/alarm' with respect to alarm data.

As shown in (a) of FIG. 9, the multifunctional sensor may be assigned with the resource access ID of '/01/04/', which is shorter than the URI, with respect to the temperature data. Among the plurality of hierarchical items in the URI with respect to the temperature data of the multifunctional sensor, 'Building_A/Floor_B/Department_C/Office_D' is converted into '01', and 'temperature_4' is converted into '04', thereby generating the resource access ID which is shorter than the URI. Further, the multifunctional sensor may be assigned with the resource access ID of '/01/26' with respect to the motion data. Likewise, the multifunctional sensor may be respectively assigned with the resource access IDs of '/01/62' and '/01/79' with respect to the video data and alarm data respectfully.

The resource access ID (corresponding to the sub resource identifier) may be created by respectively converting the plurality of hierarchical items involved in the URI (corresponding to the main resource identifier) into invariable numerals or by converting two or more hierarchical items repetitively used among the plurality of hierarchical items into invariable numerals. Thus, when the packet for identifying the resource is transferred, the sub resource identifier is embedded in the packet, and the size of the packet decreases and the efficiency of data transfer improves.

According to an embodiment of the present disclosure, the sub resource identifier may be created using a hash function, i.e. an algorithm for conversion into a short value or key. Further, the sub resource identifier may use a value that has already been used in an application protocol. For example, when an Internet-of-Things access protocol, i.e. a constrained application protocol (CoAP) improved from the existing HTTP protocol is applied, a token value for distinguishing a request/response pair may be used as the sub resource identifier. The sub resource identifier is not limited to the foregoing description, but may be variously created as long as it corresponds to and is shorter than the main resource identifier and is invariable.

The storage 13 stores the main resource identifier(s) and the sub resource identifier(s) of at least one among the plurality of electronic apparatuses. Further, the storage 13 may store the main resource identifiers and the sub resource identifiers of not only the plurality of electronic apparatuses to be connected to the first electronic apparatus 10 but also the first electronic apparatus 10 so that the plurality of electronic apparatuses may identify the first electronic apparatus 10.

The storage 13 is a memory included in the first electronic apparatus 10, which may be a nonvolatile storage medium such as a flash memory. There are no limits to data stored in the storage 13. For example, the storage 13 may store data for identifying the plurality of electronic apparatuses communicating with the first electronic apparatus 10 and information collected in the plurality of electronic apparatuses.

According to an embodiment of the present disclosure, the controller 11 controls the storage 13 to store the main resource identifier of the second electronic apparatus 21 and the sub resource identifier assigned to the second electronic apparatus 21. For example, as shown in (b) of FIG. 8, the hierarchical items, 'Building_A', 'Floor_B', 'Department_C', 'Office_D' and 'temperature_4' in the URI of the temperature sensor, and the resource access IDs, '25', '61', '78', '81' and '04' respectively assigned to the hierarchical items may be tabulated in a resource access table. Thus, if the temperature sensor is requested to collect data, the resource access ID stored in the resource access table is used to identify the temperature sensor.

Alternatively, as shown in (b) of FIG. 9, the hierarchical items of '/Building_A/Floor_B/Department_C/Office_D' in the URI with respect to the temperature, motion, video record and alarm data of the multifunctional sensor, and the hierarchical items of 'temperature_4', 'motion', 'camera' and 'alarm' with respect to the respective data are tabulated in the resource access table. Thus, if the multifunctional sensor is requested to collect the temperature, motion, video record and alarm data, the resource access ID stored in the resource access table is used to identify the data collected in the multifunctional sensor.

The controller 11 sends the second electronic apparatus 21 the sub resource identifier assigned to the second electronic apparatus 21 so that the second electronic apparatus 21 may store the sub resource identifier. The sub resource identifier assigned to the second electronic apparatus 21 is stored in the second electronic apparatus 21, and it is determined whether to connect with the second electronic apparatus 21 based on whether the sub resource identifier sent to the second electronic apparatus 21 matches with the stored sub resource identifier when connecting with the second electronic apparatus 21.

The controller 11 uses the sub resource identifier assigned to the second electronic apparatus 21 to make a request for communication to the second electronic apparatus 21. The controller 11 sends the second electronic apparatus 21 the sub resource identifier assigned for making the request for the communication to the second electronic apparatus 21. Instead of the long and variable URI-based main resource identifier, the short and invariable sub resource identifier is used for the communication between the plurality of electronic apparatuses in the Internet-of-Things environment, thereby improving the efficiency of data transfer between the electronic apparatuses.

Figure 10:
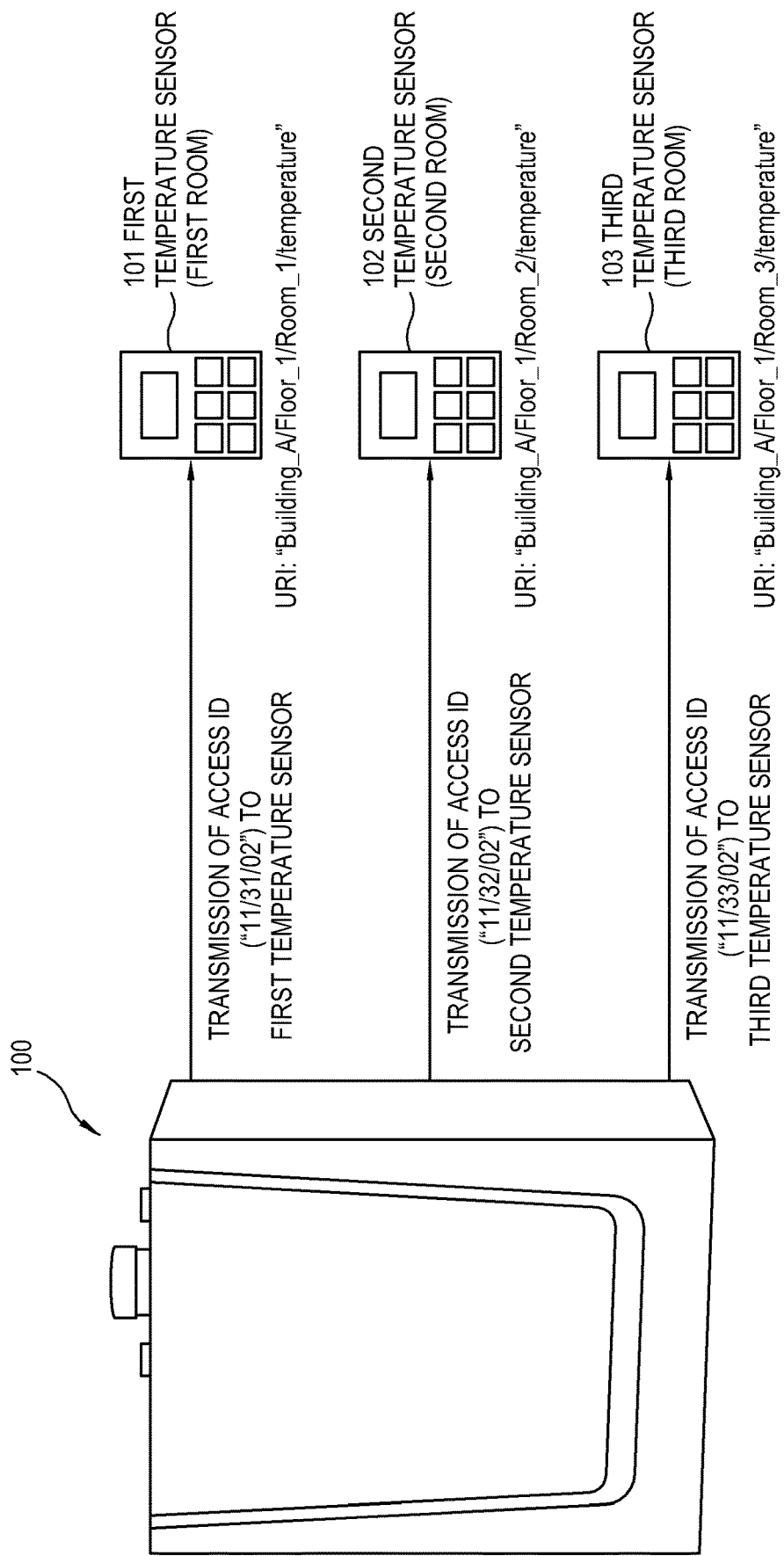
FIG. 10 illustrates transmitting a packet for accessing a resource in the Internet-of-Things environment according to an embodiment of the present disclosure.

The controller 11 begins communication with the second electronic apparatus 21 when the second electronic apparatus 21 responds to the request for communication. If the communication with the second electronic apparatus 21 begins, the controller 11 performs operations of the second electronic apparatus 21 based on the command of the first electronic apparatus 10. For example, as shown in FIG. 10, a boiler 100 respectively assigns the resource access IDs to temperature sensors 101, 102 and 103 of the first, second and third rooms respectfully and begins communication with the temperature sensors 101, 102 and 103 by sending the assigned resource access IDs to the temperature sensors 101, 102 and 103 in order to collect temperature data from the temperature sensors 101, 102 and 103. Thus, the boiler 100 connects with the temperature sensors 101, 102 and 103 of the respective rooms, and receives data about temperatures sensed by the temperature sensors 101, 102 and 103 of the respective rooms.

Figure 11:
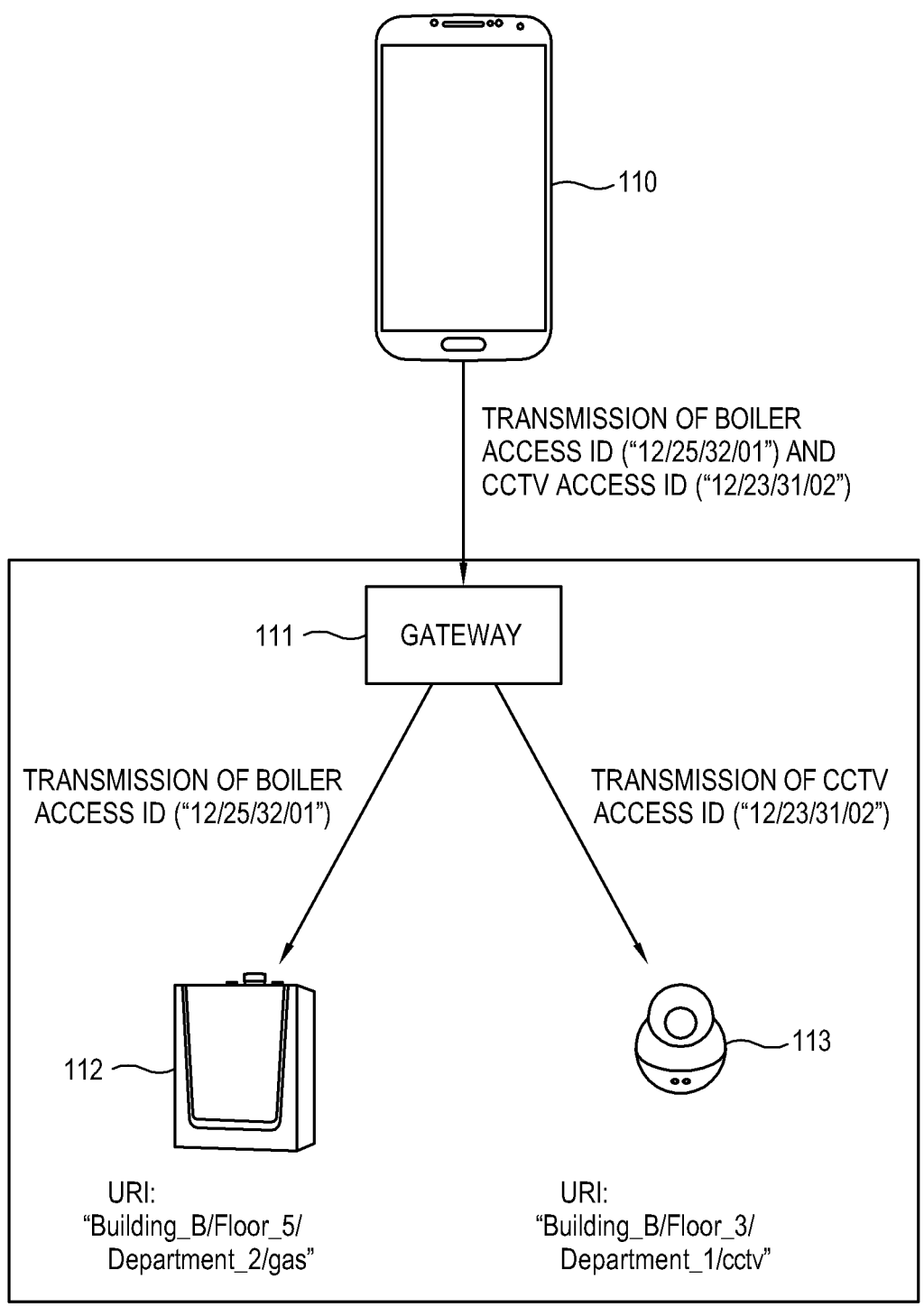
FIG. 11 illustrates transmitting a packet for accessing a resource in the Internet-of-Things environment according to an embodiment of the present disclosure.

Alternatively, as shown in FIG. 11, a smart phone 110 may give resource access IDs to a boiler 112 and a closed-circuit television (CCTV) camera 113 and begin communication with the boiler 112 and the CCTV camera 113 through the gateway 111 by sending the resource access IDs to the boiler 112 and the CCTV camera 113 in order to collect data from the boiler 112 and the CCTV camera 113 inside a house. Thus, the smart phone 110 connects with the boiler 112 and the CCTV camera 113, and receives data about temperature sensed by the boiler 112 or information about images photographed by the CCTV camera 113 in response to a user's input to the smart phone 110.

The second electronic apparatus 21 receives the sub resource identifier, which corresponds to the main resource identifier of the second electronic apparatus 21 and has a smaller unit size than the main resource identifier, from the first electronic apparatus 10 among the plurality of electronic apparatuses respectively assigned with the main resource identifiers for identifying the apparatuses over the network. The second electronic apparatus 21 stores the received sub resource identifier corresponding to the main resource identifier of the second electronic apparatus 21, and responds to the request for communication from the first electronic apparatus 10 based on the stored sub resource identifier. The second electronic apparatus 21 performs operations based on the command from the first electronic apparatus 10 when communication with the first electronic apparatus 10 begins.

Among the elements of the second electronic apparatus 21, the communicator 16 communicates with at least one of the plurality of electronic apparatuses assigned with the main resource identifiers for identifying the apparatus over the network. According to an embodiment of the present disclosure, the communicator 16 may connect with the communicator 12 of the first electronic apparatus 10 in order to communicate with the first electronic apparatus 10. For example, the communicator 16 may communicate with the first electronic apparatus 10 by Bluetooth, ZigBee, 6LoW-PAN, and near field wireless communication methods. The communicator 16 may perform paring with the first electronic apparatus 10 when it uses Bluetooth for communication with the first electronic apparatus. Alternatively, the communicator 16 may connect with the first electronic apparatus 10 by Internet or near field wireless communication.

The controller 17 receives the sub resource identifier, which corresponds to the main resource identifier of the second electronic apparatus 21 and has a smaller unit size than the main resource identifier, from the first electronic apparatus 10 among the plurality of electronic apparatuses.

According to an embodiment of the present disclosure, the main resource identifier may include a plurality of hierarchical items which respectively indicates at least one of positions and functions of the plurality of electronic apparatuses in the Internet-of-Things environment. The main resource identifier may be a uniform resource identifier (URI) which is a unique address for identifying a resource over the Internet. For example, as shown in FIG. 8, if the second electronic apparatus 21 is a fourth temperature sensor at an office 'D' to be managed by a department 'C' on a floor 'B' in a building 'A,' the temperature sensor may be assigned with a URI of '/Building_A/Floor_B/Department_C/Office_D/temperature_4.' The temperature sensor may receive '/25/61/78/81/04' as a resource access ID, which corresponds to and is shorter than the URI of the temperature sensor and invariable, from the first electronic apparatus 10. The temperature sensor receives the short and invariable resource access ID instead of the long and variable URI from the first electronic apparatus 10, thereby improving data transfer efficiency between the first electronic apparatus 10 and the temperature sensor.

The storage 18 of the second electronic device 21 stores the main resource identifier and the sub resource identifier of at least one among the plurality of electronic apparatuses. Further, the storage 18 may store the main resource identifier and the sub resource identifier of not only the plurality of electronic apparatuses connectable with the second electronic apparatus 21 but also the second electronic apparatus 21, so that the plurality of electronic apparatuses may identify the second electronic apparatus 21.

The controller 17 of the second electronic device 21 controls the storage 18 to store the sub resource identifier(s) received from the first electronic apparatus 10 corresponding to the main resource identifier of the second electronic apparatus 21. For example, as shown in (b) of FIG. 8, the hierarchical items respectively involved in the URL of the temperature sensor, 'Building_A', 'Floor_B', 'Department_C', 'Office_D' and 'temperature_4, and the items of the resource access ID received from the first electronic apparatus 10, '25', '61', '78', '81' and '04' are stored in the resource access table. The items of the resource access ID are stored corresponding to the hierarchical items of the URI. Thus, if the first electronic apparatus 10 makes a request for data collection to the temperature sensor, the resource access ID stored in the resource access table is used to identify the temperature sensor.

The controller 17 responds to the request for the communication from the first electronic apparatus 10 based on the stored sub resource identifier. According to an embodiment of the present disclosure, if the sub resource identifier of the second electronic apparatus 21 is received from the first electronic apparatus 10 making the request for communication and there is a previously stored sub resource identifier matching the received sub resource identifier, the controller 17 may begin communication with the first electronic apparatus 10. On the other hand, if there are no previously stored sub resource identifiers matching the sub resource identifier received from the first electronic apparatus 10, the controller 17 may determine that the sub resource identifier received from the first electronic apparatus 10 is not valid.

If communication with the first electronic apparatus 10 begins, the controller 17 may perform operations based on a command from the first electronic apparatus 10.

According to an embodiment of the present disclosure, instead of the URI, the short and invariable resource identifier is used for communication between the plurality of electronic apparatuses in the Internet-of-Things environment, thereby improving efficiency of data transfer between the electronic apparatuses. Further, the short and invariable resource identifier is used for identifying the plurality of electronic apparatuses, and reduces energy use in the electronic apparatus.

Figure 2:
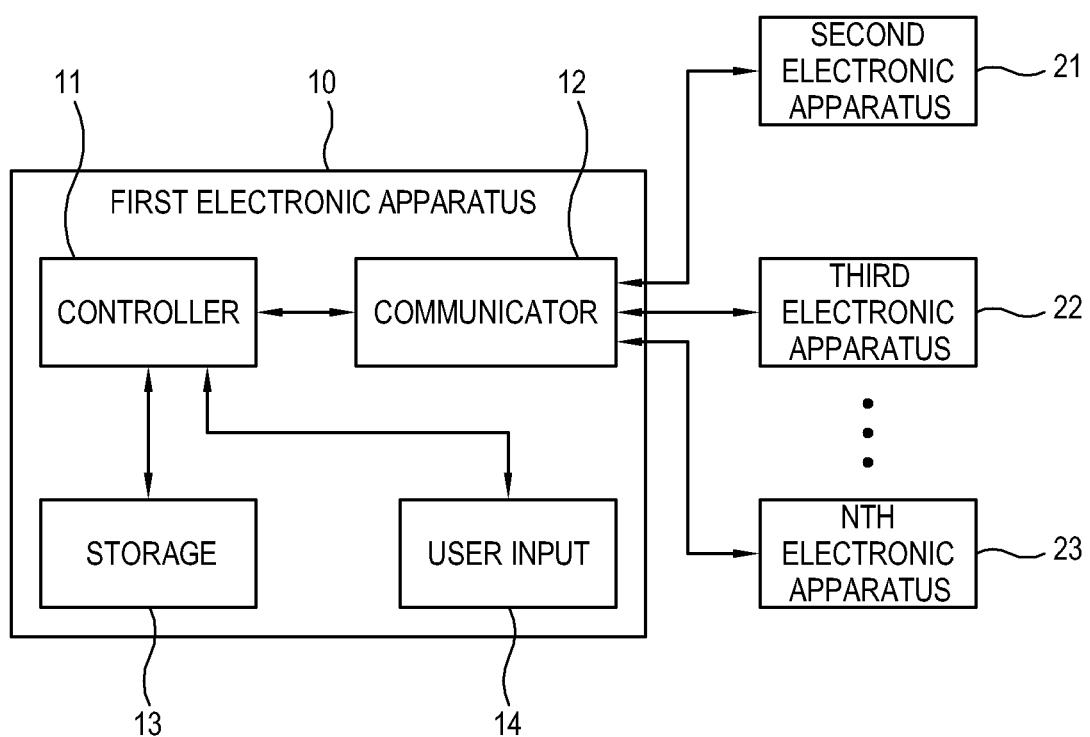
FIG. 2 is a block diagram of an electronic apparatus that communicates with a plurality of electronic apparatuses according to an embodiment of the present disclosure.

FIG. 2 is a block diagram of showing the first electronic apparatus that communicates with a plurality of electronic apparatuses according to an exemplary embodiment. As shown in FIG. 2, the first electronic apparatus 10 includes the controller 11, the communicator 12, the storage 13, and the user input 14, and connects with the plurality of electronic apparatuses, i.e. the second electronic apparatus 21, a third electronic apparatus 22, . . . , an Nth electronic apparatus 23. Here, the controller 11, the communicator 12, the storage 13 and the user input 14 are the same as those of the first electronic apparatus 10 shown in FIG. 1, and thus repetitive descriptions thereof will be avoided as necessary.

Figure 3:
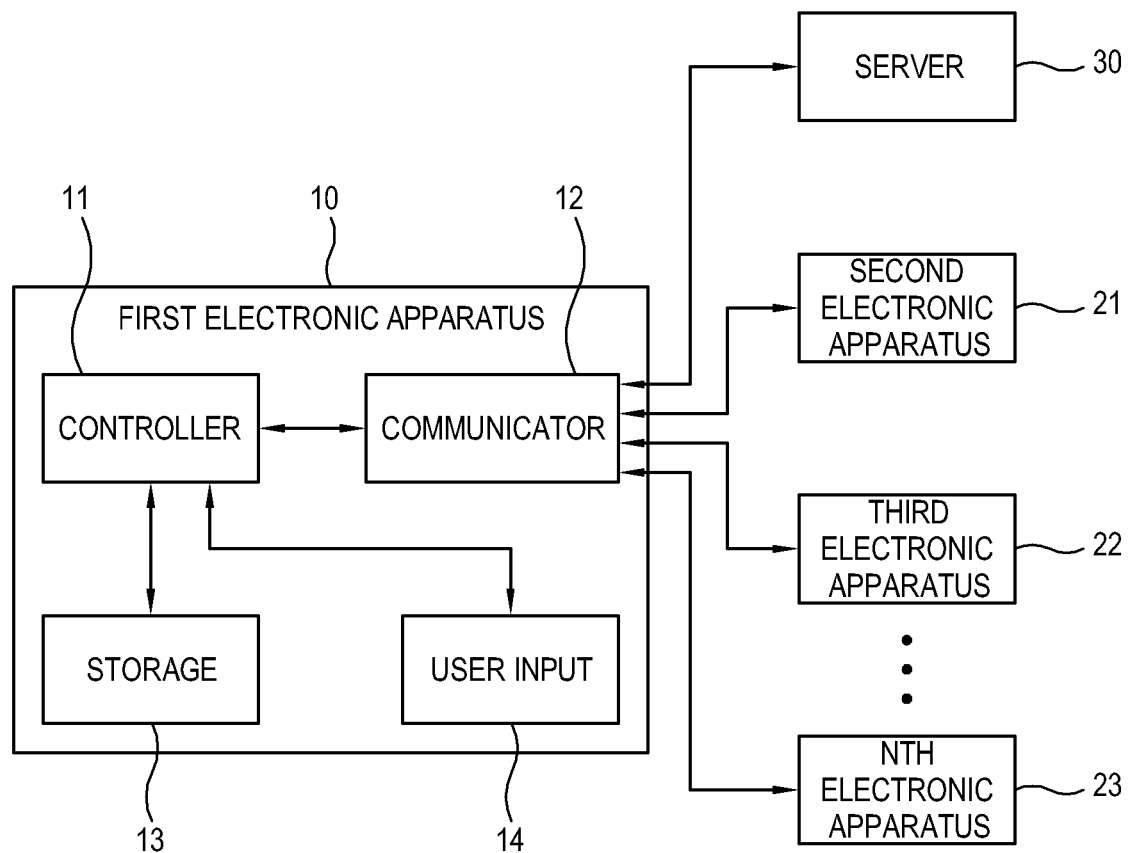
FIG. 3 is a block diagram of an electronic apparatus that communicates with a plurality of electronic apparatuses and a server according to an embodiment of the present disclosure.

Referring to FIG. 3, the controller 11 assigns the sub resource identifier(s), which corresponds to each main resource identifier of the plurality of electronic apparatuses, i.e. the second electronic apparatus 21, the third electronic apparatus 22 . . . , and the Nth electronic apparatus 23 and has a smaller unit size of the main resource identifier, to each electronic apparatus. The controller 11 transmits the assigned sub resource identifiers to the second electronic apparatus 21, the third electronic apparatus 22 . . . , and the Nth electronic apparatus 23 so that the electronic apparatuses may store their sub resource identifiers, respectively.

The controller 11 makes a request for communication to each of the second electronic apparatus 21, the third electronic apparatus 22 . . . , and the Nth electronic apparatus 23 through the sub resource identifier assigned to each of the plurality of electronic apparatuses, and begins communication with each of the electronic apparatuses when each of the electronic apparatus responds to the request for communication. Thus, the controller 11 performs operations of the second electronic apparatus 21, the third electronic apparatus 22 . . . , and the Nth electronic apparatus 23 based on a command from the first electronic apparatus 10.

According to an embodiment of the present disclosure, as shown in FIG. 10, the boiler 100 makes a request for access to each of the temperature sensors 101, 102 and 103 to collect temperature data from a first temperature sensor 101 of a first room, a second temperature sensor 102 of a second room and a third temperature sensor 103 of a third room. The first temperature sensor 101 is assigned a URI of "Building_A/Floor_1/Room_1/temperature" indicating the temperature sensor positioned at the first room on the first floor in the building 'A,' and the second temperature sensor 102 is assigned a URI of "Building_A/Floor_1/Room_2/temperature" indicating the temperature sensor positioned at the second room on the first floor in the building 'A'. Likewise, the third temperature sensor 103 is assigned a URI of "Building_A/Floor_1/Room_3/temperature" indicating the temperature sensor positioned at the third room on the first floor in the building 'A'.

To identify each of the temperature sensors 101, 102 and 103, the URIs assigned as above may be transmitted in a packet. The URI has advantages of being easily understood by a user and includes information, but has disadvantages of being long and increasing the size of packets transmitted and received as it includes more information. Therefore, if the URI is used for identifying things in the Internet-of-Things environment where a low-bandwidth communication method such as Bluetooth is frequently used, a lower data transfer efficiency is provided.

To solve such a problem, the boiler 100 may use the resource access ID, which is shorter than the URI and invariable, for identifying each of the temperature sensors 101, 102 and 103. For example, the boiler 100 may create "11/31/02" as the resource access ID for the first temperature sensor 101. That is, the URI of "Building_A/Floor_1/Room_1/temperature" for the first temperature sensor 101 may be converted into the resource access ID by assigning "11" to "Building_A/Floor_1", assigning "31" to "Room_1", and assigning "02" to "temperature". Similarly, "11/32/02" may be created as the access ID for the second temperature sensor 102, and "11/33/02" may be created as the access ID to the third temperature sensor 103. The boiler 100 begins communication with the temperature sensors 101, 102 and 103 of the respective rooms by transmitting the access IDs, which are respectively assigned to the temperature sensors 101, 102 and 103 and embedded in the packets, to the temperature sensors 101, 102 and 103. Thus, the boiler 100 uses the short and invariable access ID to identify the temperature sensors 101, 102 and 103 of the respective rooms, and receives the temperature data from the temperature sensors 101, 102 and 103.

The first electronic apparatus according to an embodiment of the present disclosure, uses the short and invariable resource identifier instead of the long and variable URI in order to communicate with the plurality of electronic apparatuses in the Internet-of-Things environment, thereby improving an efficiency of data transfer between the electronic apparatuses.

FIG. 3 is a block diagram of an electronic apparatus that communicates with a plurality of electronic apparatuses and a server according to an embodiment of the present disclosure.

As shown in FIG. 3, the first electronic apparatus 10 includes the controller 11, the communicator 12, the storage 13 and the user input 14, and connects with the plurality of electronic apparatuses, the second electronic apparatus 21, the third electronic apparatus 22, . . . , and the Nth electronic apparatus 23 and a server 30. Here, the controller 11, the communicator 12, the storage 13 and the user input 14 are the same as those of the first electronic apparatus 10 shown in FIG. 1, and thus repetitive descriptions are unnecessary.

The server 30 stores the main resource identifiers of the plurality of electronic apparatuses, the second electronic apparatus 21, the third electronic apparatus 22 . . . , and the Nth electronic apparatus 23, respectively. The main resource identifiers stored in the server 30 may be received from the plurality of electronic apparatuses. The server 30 may be a resource directory (RD) server having an RD function. The RD server stores descriptions of resources serviced by things to which the Internet-of-Things access protocol, i.e. CoAP is applied, and then informs suitable Internet of Things resources when clients make requests for required Internet-of-Things resources to the RD server.

The controller 11 makes a request for searching the plurality of electronic apparatuses, the second electronic apparatus 21, the third electronic apparatus 22 . . . , and the Nth electronic apparatus 23 to the server 30, and receives the main resource identifiers of the respective electronic apparatuses from the server 30. The controller 11 assigns the sub resource identifiers, which correspond to the main resource identifiers of the respective electronic apparatuses received from the server 30 and have a smaller unit size than the main resource identifiers, to the plurality of electronic apparatuses, respectively. The controller 11 sends the plurality of electronic apparatuses the assigned sub resource identifiers to be respectively stored in the second electronic apparatus 21, the third electronic apparatus 22 . . . , and the Nth electronic apparatus 23.

The controller 11 uses the sub resource identifiers respectively assigned to the plurality of electronic apparatuses to request communication to each of the second electronic apparatus 21, the third electronic apparatus 22 . . . , and the Nth electronic apparatus 23, and begins communication with each of the electronic apparatuses when each apparatus responds to the request for communication. Thus, the controller 11 performs operations of the second electronic apparatus 21, the third electronic apparatus 22 . . . , and the Nth electronic apparatus 23 based on a command of the first electronic apparatus 10.

Figure 12:
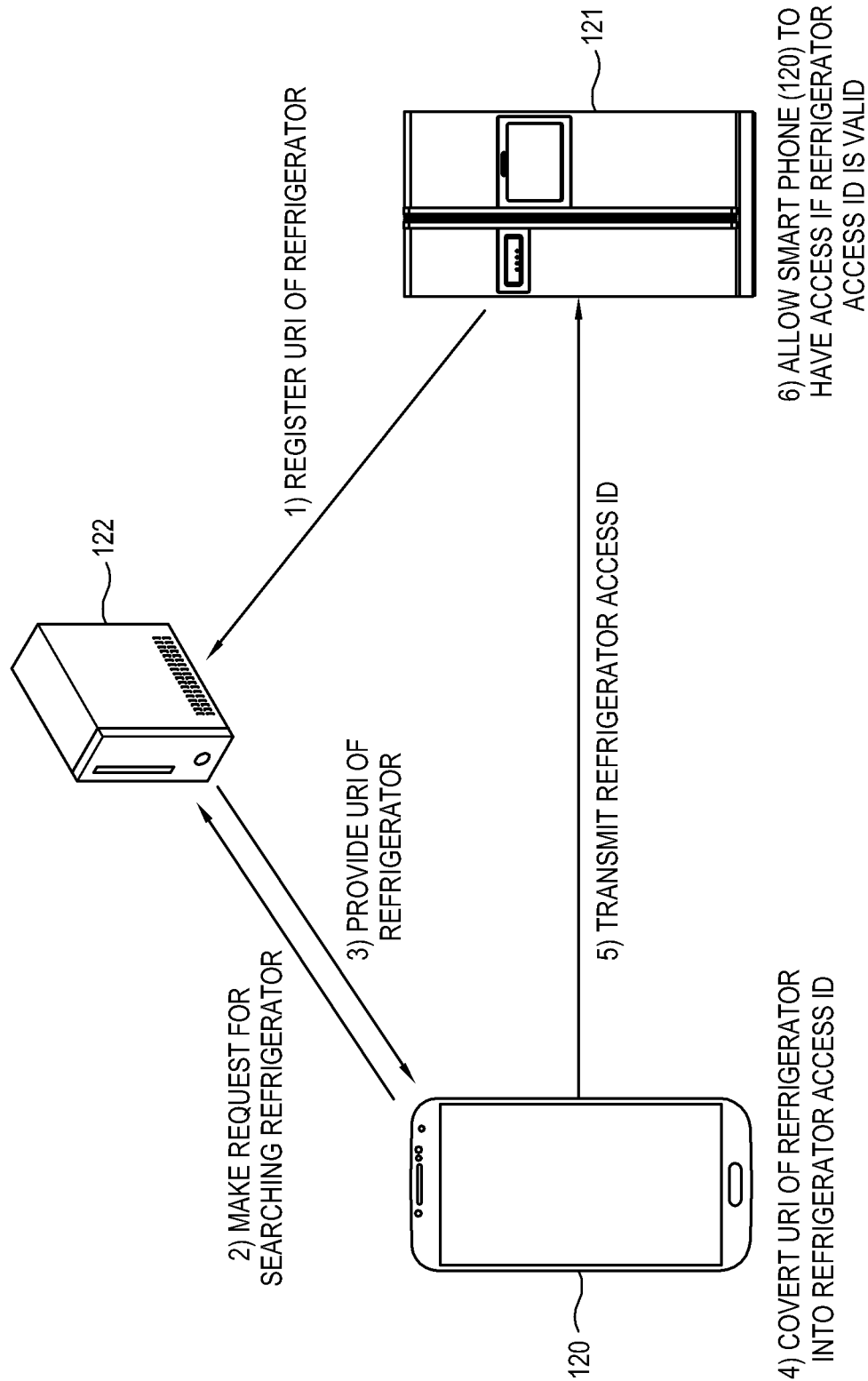
FIG. 12 illustrates accessing a resource using a URI provided from a server according to an embodiment of the present disclosure.

According to an embodiment of the present disclosure, as shown in FIG. 12, a server 122 receives and stores a resource identifier, a URI for identifying the refrigerator 121 from the refrigerator 121. The server 122 may store the resource identifiers for other Internet-of-Things resources as well as the refrigerator 121. A user may connect a smart phone 120 with the refrigerator 121, control refrigerating and freezing temperatures of the refrigerator 121, and receive images of food kept inside the refrigerator 121. A user executes a predetermined application in the smart phone 120 and makes a request for searching the refrigerator 121 to the server 122.

In response to the request for the search from the smart phone 120, the server 122 may provide a list of refrigerators stored therein. The smart phone 120 displays the list of refrigerators provided by the server 122 on a screen thereof, and selects a refrigerator 121 desired to be connected in the displayed list of refrigerators. The list of refrigerators may include all refrigerators placed within a near field area and connectable by Bluetooth but also refrigerators connectable via the Internet. Further, the list of refrigerators may include URIs of the plurality of refrigerators searched from the server 122.

If a user selects the refrigerator 121 desired to be connected from the list of refrigerators displayed on the smart phone 120, the smart phone 120 creates a refrigerator access ID, which corresponds to and is shorter than the URI of the selected refrigerator 121 and invariable, and transmits the created refrigerator access ID to the refrigerator 121. If the refrigerator access ID transmitted to the refrigerator 121 is valid, and the transmitted refrigerator access ID matches the access ID previously stored in the refrigerator 121, the refrigerator 121 may inform the smart phone 120 that the refrigerator access ID is identified. Thus, the smart phone 120 has access to the refrigerator 121, thereby performing operations such as controlling the refrigerator 121, receiving data from the refrigerator 121, etc.

According to an embodiment of the present disclosure, the URIs for identifying each of the plurality of electronic apparatuses in the Internet-of-Things environment are registered and stored in the server, so that a user's electronic apparatus may receive the URI for the electronic apparatus desired to be connected from the server by searching. Further, the URI received from the server is converted into the resource access ID which is shorter than the URI and invariable, and the converted resource access ID is transmitted to the electronic apparatus desired to be connected, thereby identifying the electronic apparatus.

Figure 4:
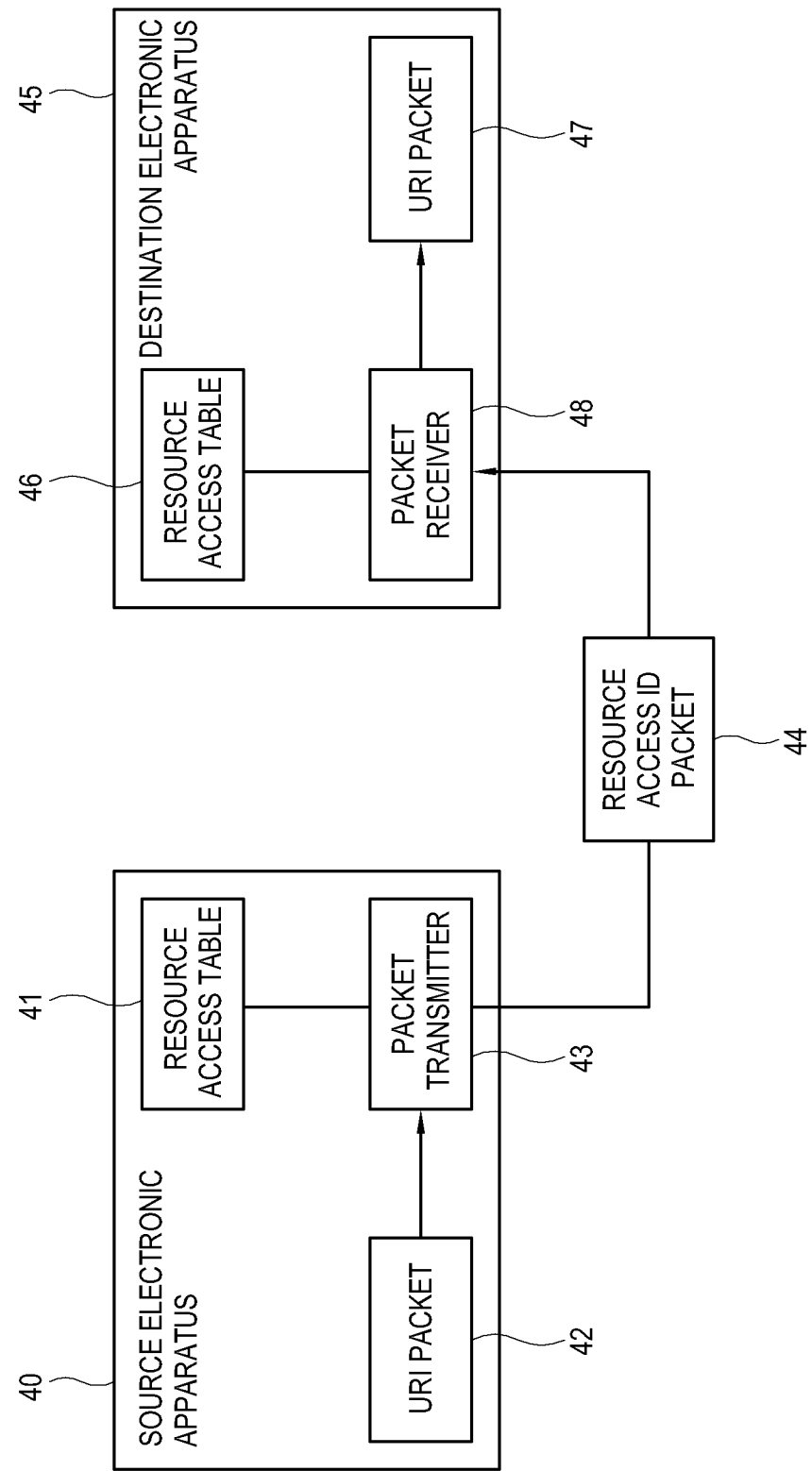
FIG. 4 is a block diagram of resource access from a source electronic apparatus to a destination electronic apparatus in an Internet-of-Things environment according to an embodiment of the present disclosure.

FIG. 4 is a block diagram of resource access from a source electronic apparatus to a destination electronic apparatus in an Internet-of-Things environment according to an embodiment of the present disclosure.

As shown in FIG. 4, a source electronic apparatus 40 includes a resource access table 41 and a packet transmitter 43, and a destination electronic apparatus 45 includes a resource access table 46 and a packet receiver 48. According to an embodiment of the present disclosure, the source electronic apparatus 40 may receive a packet 42, which includes the URI of the destination electronic apparatus 45 desired to be accessed, from an application being executed in the source electronic apparatus 40. The URI, that is, the resource identifier of the apparatus connectable with the source electronic apparatus 40, is previously set in the application, and the set URI is provided when the application is executed.

Alternatively, the source electronic apparatus 40 may receive the URI packet 42, in which the URI of the destination electronic apparatus 45 desired to be accessed is embedded, from an external server. That is, the server stores the URIs of the plurality of electronic apparatuses, and the source electronic apparatus 40 receives the URI of the electronic apparatus desired to be connected by making a request for search to the server.

If receiving the URI packet 42 for identifying the destination electronic apparatus 45, the source electronic apparatus 40 checks whether the resource access ID corresponding to the received URI is stored in the resource access table 41. If the resource access ID corresponding to the received URI is stored in the resource access table 41, the packet transmitter 43 sends the destination electronic apparatus 45 the resource access ID packet 44 having the resource access ID converted from the URI. On the other hand, if the resource access ID corresponding to the received URI is not stored in the resource access table 41, the packet transmitter 43 creates a resource access ID corresponding to the URI and adds the resource access ID to packet 44, thereby transmitting the resource access ID packet 44 to the destination electronic apparatus 45.

According to an embodiment of the present disclosure, the resource access ID may be created by converting the respective hierarchical items, which indicate the positions or functions in the URI, into short and invariable numerals. Alternatively, the resource access ID may be created using a hash function, i.e. an algorithm for conversion into a short value or key. Alternatively, the resource access ID may be created using a token value for distinguishing a request/response pair, when the Internet-of-Things access protocol, i.e. the CoAP which is improved from the existing HTTP protocol is applied. The method of creating the resource access ID is not limited to the present disclosure, but may be variously achieved.

If the destination electronic apparatus 45 receives the resource access ID packet 44 including the resource access ID from the source electronic apparatus 40, the packet receiver 48 looks up the resource access ID included in the resource access ID packet 44 on the resource access table 46. As a result of the search, if the resource access ID is stored in the resource access table 46, the packet receiver 48 converts the resource access ID into the corresponding stored URI and outputs it to a URI packet 47. On the other hand, if the resource access ID is not stored in the resource access table 46, the packet receiver 48 informs the source electronic apparatus 40 that a nonexistent resource access ID was received.

According to an embodiment of the present disclosure, if the destination electronic apparatus 45 receives the resource access ID packet 44 from the source electronic apparatus 40, the packet receiver 48 checks whether the URI is included in the resource access ID packet 44. If the URI is included in the resource access ID packet 44, the packet receiver 48 tabulates the received resource access ID and URI in the resource access table 46. Thus, if the destination electronic apparatus 45 receives the resource access ID from the source electronic apparatus 40, it is possible to determine whether the received resource access ID is valid by looking up the resource access table 46.

Figure 5:
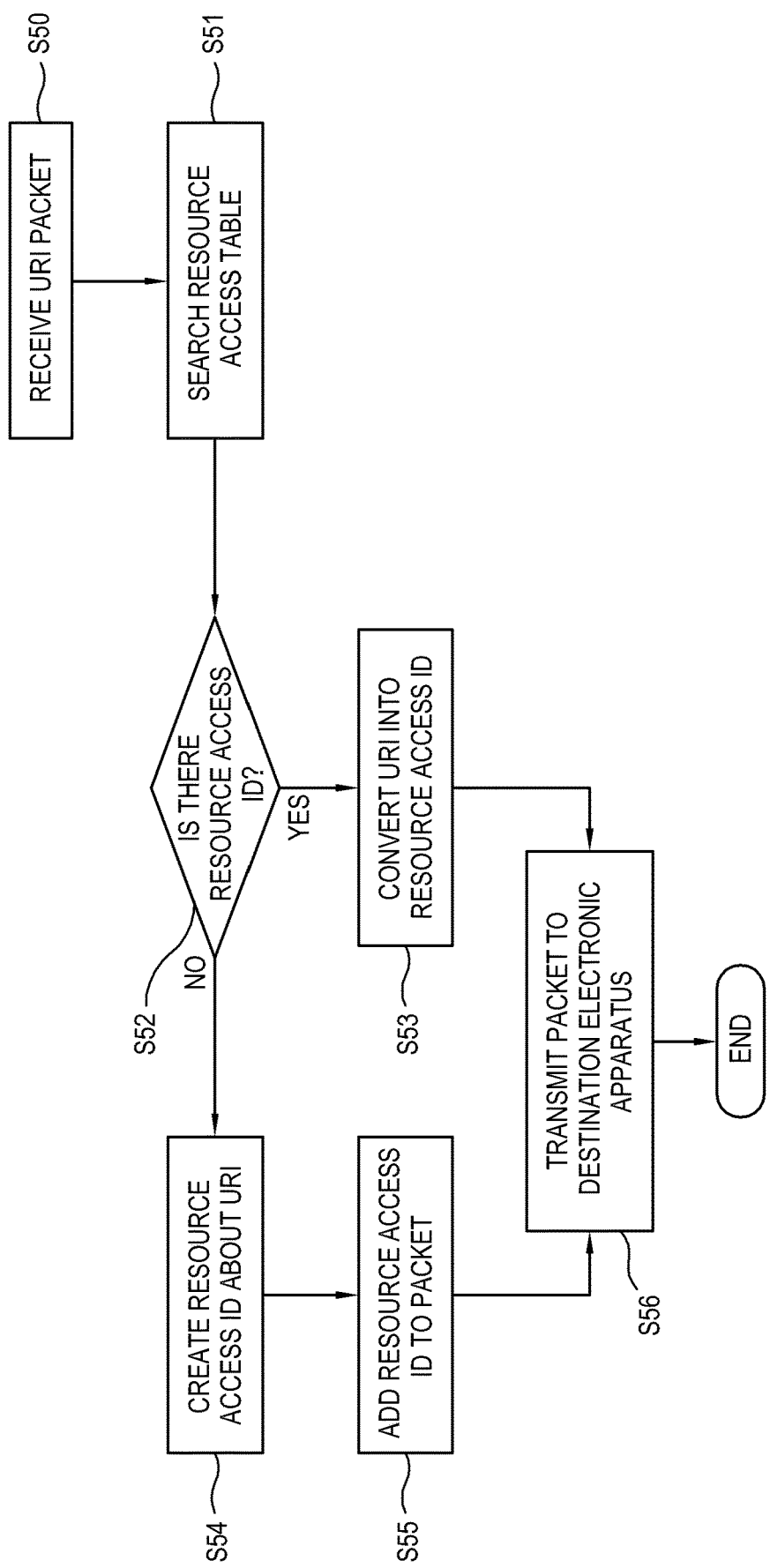
FIG. 5 is a flowchart of operations of a source electronic apparatus according to an embodiment of the present disclosure.

FIG. 5 is a flowchart of operations of a source electronic apparatus according to an embodiment of the present disclosure.

As shown in FIG. 5, at step S50, the URI packet of the destination electronic apparatus desired to be connected is received. Here, the URI packet may be provided by an application executed in the source electronic apparatus or an external server. Next, at step S51 the resource access table is looked up, and at step S52 it is determined whether the resource access table includes the resource access ID corresponding to the received URI. As a result of the determination, if the resource access ID exists, the URI is converted into the resource access ID at step S53, and the packet including the resource access ID is transmitted to the destination electronic apparatus at step S56. As a result of the determination, if the resource access ID does not exist, the resource access ID is created corresponding to the URI at step S54, and the resource access ID is added to the packet at step S55 and transmitted to the destination electronic apparatus at step S56.

Figure 6:
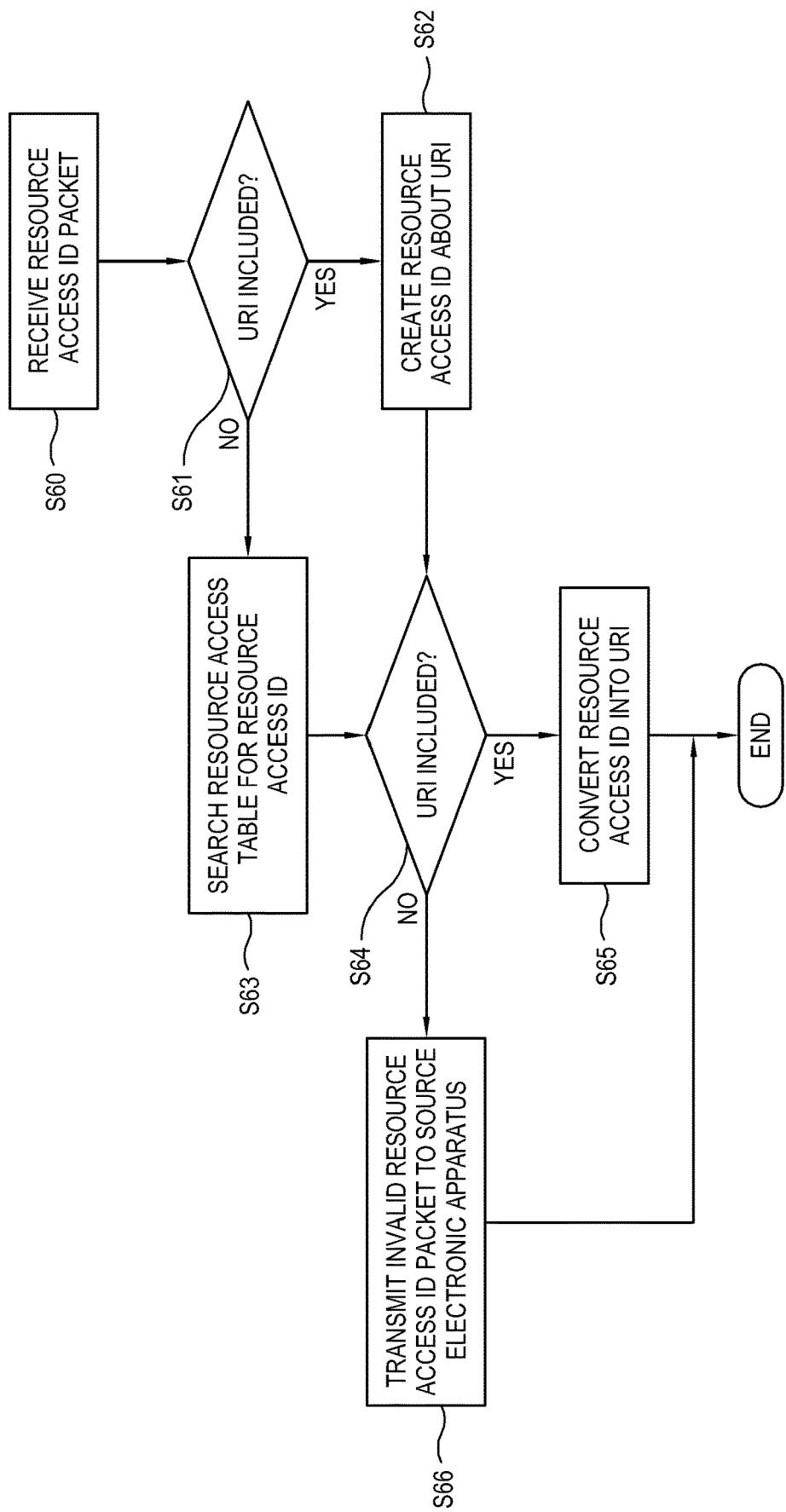
FIG. 6 is a flowchart of operations of a destination electronic apparatus according to an embodiment of the present disclosure.

FIG. 6 is a flowchart of operations of a destination electronic apparatus according to an embodiment of the present disclosure.

As shown in FIG. 6, the resource access ID packet is received at step S60, and checked at step S61 as to whether the URI is included in the received resource access ID packet. If the URI is included in the resource access ID packet, at step S62 the resource access ID is created with respect to the URI. The resource access ID included in the received packet and the corresponding URI are tabulated in the resource access table, to determine whether the resource access ID received from the source electronic apparatus is valid. Further, if it is determined at step S61 that the URI has not been included in the resource access ID packet, at step S63 the resource access ID is looked up in the resource access table, and it is checked at step S64 as to whether the URI corresponding to the resource access ID is included in the resource access table. If the resource access table includes the URI, at step S65 the resource access ID is converted into the corresponding URI to be identified by the destination electronic apparatus. If the resource access table does not include the URI, at step S66 it is determined that the resource access ID is not valid, and the invalid resource access ID packet is transmitted to the source electronic apparatus.

Figure 7:
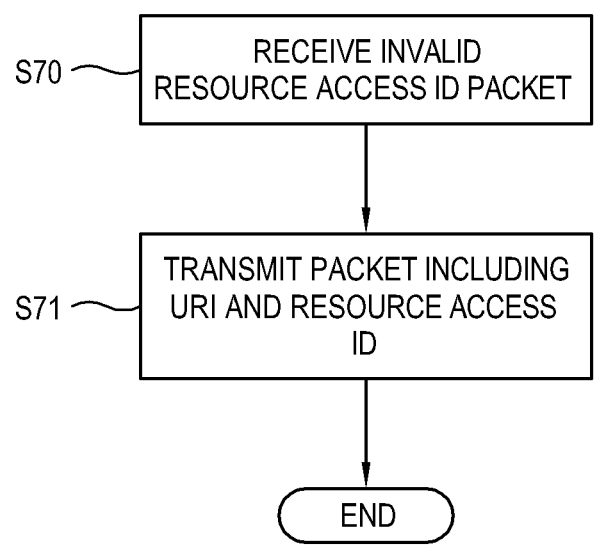
FIG. 7 is a flowchart of operations of a source electronic apparatus according to an embodiment of the present disclosure.

FIG. 7 is a flowchart of operations of a source electronic apparatus according to an embodiment of the present disclosure.

As shown in FIG. 7, at step S70 the source electronic apparatus receives the invalid resource access ID packet from the destination electronic apparatus. The invalid resource access ID packet is transmitted from the destination electronic apparatus when the resource access ID does not exist as a result of looking up the resource access table by the destination electronic apparatus. Since the resource access ID corresponding to the URI has not been created in the destination electronic apparatus, at step S71 the packet including the URI and the resource access ID is transmitted to the destination electronic apparatus, so that the destination electronic apparatus may create the resource access ID corresponding to the URI.

FIG. 8 is a table of short and invariable resource identifiers corresponding to a URI of an electronic apparatus according to an embodiment of the present disclosure.

As shown in FIG. 8, the URI resource identifier may be used for identifying the plurality of electronic apparatuses in the Internet-of-Things environment. For example, if an electronic apparatus is a fourth temperature sensor at an office 'D' to be managed by a department 'C' on a floor 'B' in a building 'A,' the temperature sensor may be assigned with a URI of '/Building_A/Floor_B/Department_C/Office_D/temperature_4' as shown in (a) to show the position and function of the temperature sensor. Although such a URI is easy to understand and includes more information, data transfer efficiency may be decreased when the packet is transmitted.

The temperature sensor may be assigned with a resource access ID of '/25/61/78/81/04' which is shorter than the URI. That is, the hierarchical items of 'Building_A', 'Floor_B', 'Department_C', 'Office_D' and 'temperature_4' divided by '/' in the URI of the temperature sensor are respectively converted into double digits of '25', '61', '78', '81' and '04', thereby generating a resource access ID which is shorter than the URI and invariable.

Further, as shown in (b) of FIG. 8, the hierarchical items, 'Building_A', 'Floor_B', 'Department_C', 'Office_D' and 'temperature_4' of the URI of the temperature sensor, and the resource access IDs, '25', '61', '78', '81' and '04' respectively assigned to the hierarchical items may be tabulated in a resource access table.

The resource access ID which is shorter than the URI and invariable is used in the Internet-of-Things environment, and improve efficiencies of energy use and data transfer by decreasing the packet size when the packet is transmitted. Further, if a request for having access to the resource is repetitively made, the resource access ID stored in the resource access table is used to quickly identify the resource.

FIG. 9 is a table of short and invariable resource identifiers corresponding to a URI of an electronic apparatus according to an embodiment of the present disclosure.

As shown in FIG. 9, if the electronic apparatus is a multifunctional sensor installed at an office 'D' to be managed by a department 'C' on a floor 'B' in a building 'A' and collecting data such as a temperature, a motion, a video, an alarm, etc., as shown in (a) of FIG. 9 the multifunctional sensor may be assigned a URI of '/Building_A/Floor_B/Department_C/Office_D/temperature_4' with respect to temperature data. Further, the multifunctional sensor may be assigned a URI of '/Building_A/Floor_B/Department_C/Office_D/motion' with respect to motion data. Likewise, the multifunctional sensor may be assigned a URI of '/Building_A/Floor_B/Department_C/Office_D/camera' with respect to video data, and a URI of '/Building_A/Floor_B/Department_C/Office_D/alarm' with respect to alarm data.

The multifunctional sensor may be assigned with the resource access ID of '/01/04', which is shorter than the URI, with respect to the temperature data. That is, among the plurality of hierarchical items in the URI with respect to the temperature data of the multifunctional sensor, 'Building_A/Floor_B/Department_C/Office_D' is converted into '01', and 'temperature_4' is converted into '04', thereby generating the resource access ID which is shorter than the URI. Further, the multifunctional sensor may be assigned with the resource access ID of '/01/26' with respect to the motion data. Likewise, the multifunctional sensor may be respectively assigned with the resource access IDs of '/01/62' and '/01/79' with respect to the video record and alarm data.

Further, as shown in (b) of FIG. 9, the hierarchical items of '/Building_A/Floor_B/Department_C/Office_D' involved in the URI with respect to the temperature, motion, video and alarm data of the multifunctional sensor, and the hierarchical items of 'temperature_4', 'motion', 'camera' and 'alarm' with respect to the respective data are tabulated in the resource access table.

In the Internet-of-Things environment, the repetitive hierarchical items among the plurality of hierarchical items of the URI are converted into one resource access ID, thereby improving data transfer efficiency when the packet is transferred. Further, when the request for having access to the resource is repetitively made, the resource access ID stored in the resource access table may be used to quickly identify the resource.

FIG. 10 illustrates transmitting a packet for accessing a resource in the Internet-of-Things environment according to an embodiment of the present disclosure.

As shown in FIG. 10, if it is desired to access a plurality of things by Bluetooth using a low bandwidth communication method in the Internet-of-Things environment, the resource access ID which is shorter than the URI and invariable may be used instead of the URI of each resource. For example, the boiler 100 communicates with the first temperature sensor 101 of the first room, the second temperature sensor 102 of the second room and the third temperature sensor 103 of the third room by Bluetooth, and makes a request for access to each of the temperature sensors 101, 102 and 203 to collect temperature data from each of the temperature sensors 101, 102 and 103. The first temperature sensor 101 is assigned with a URI of "Building_A/Floor_1/Room_1/temperature" indicating the temperature sensor positioned at the first room on the first floor in the building 'A,' and the second temperature sensor 102 is assigned with a URI of "Building_A/Floor_1/Room_2/temperature" indicating the temperature sensor positioned at the second room on the first floor in the building 'A'. Likewise, the third temperature sensor 103 is assigned with a URI of "Building_A/Floor_1/Room_3/temperature" indicating the temperature sensor positioned at the third room on the first floor in the building 'A'.

To improve the efficiency of data transfer when the packet for accessing each of the temperature sensors 101, 102 and 103 is transmitted in the Bluetooth communication environment, the boiler 100 may use the resource access ID, which is shorter than the URI and invariable, instead of the long and variable URI. For example, the boiler 100 may create "11/31/02" as the resource access ID to the first temperature sensor 101. That is, the URI of "Building_A/Floor_1/Room_1/temperature" for the first temperature sensor 101 may be converted into the resource access ID by assigning "11" to "Building_A/Floor_1", assigning "31" to "Room_1", and assigning "02" to "temperature". Similarly, "11/32/02" may be created as the access ID to the second temperature sensor 102, and "11/33/02" may be created as the access ID to the third temperature sensor 103. The boiler 100 begins communication with the temperature sensors 101, 102 and 103 of the respective rooms by transmitting the access IDs, which are respectively assigned to the temperature sensors 101, 102 and 103 and embedded in the packets, to the temperature sensors 101, 102 and 103. Thus, the boiler 100 uses the short and invariable access ID to identify the temperature sensors 101, 102 and 103 of the respective rooms, and receives the temperature data from the temperature sensors 101, 102 and 103.

FIG. 11 illustrates transmitting a packet for accessing a resource in the Internet-of-Things environment according to an embodiment of the present disclosure.

As shown in FIG. 11, if it is desired to access a plurality of things by the Internet and near field wireless communication in the Internet-of-Things environment, the resource access ID which is shorter than the URI and invariable may be used instead of the URI of each resource. For example, suppose that a user wants to receive data from the boiler 112 and the CCTV camera 113 placed inside a house through the smart phone 110 outside the house. The smart phone 110 transmits the resource access IDs of the boiler 112 and the CCTV camera 113 to a gateway 111 through the Internet, and the resource access IDs transmitted to the gateway 111 are respectively transferred to the boiler 112 and the CCTV camera 113 through Bluetooth and near field wireless communication methods.

The access ID for the boiler 112 may be created by converting the URI "Building_B/Floor_5/Department_2/gas" assigned to the boiler 112 into "12/25/32/01." Further, the access ID for the CCTV camera 113 may be created by converting the URI "Building_B/Floor_3/Department_1/cctv" assigned to the CCTV camera 113 into "12/23/31/02."

The smart phone 110 assigns the resource access IDs, which are shorter than the URIs and invariable, to the boiler 112 and the CCTV camera 113, and transmits them to the respective apparatuses through the Internet and Bluetooth communication, thereby communicating with the boiler 112 and the CCTV camera 113. Thus, the smart phone 110 connects with the boiler 112 and the CCTV camera 113, and controls the boiler 112 to adjust the temperature of each room or receives video information taken by the CCTV camera 113 in response to a user's input to the smart phone 112.

FIG. 12 illustrates accessing a resource using a URI provided from a server according to an embodiment of the present disclosure.

As shown in FIG. 12, the server 122 stores the resource identifiers of the resources available in the Internet-of-Things environment, and provides the resource identifier in response to a request. For example, the server 122 may be a resource directory (RD) server that stores descriptions of things to which a protocol for accessing the resources of the Internet-of-Things, i.e. a CoAP is applied, and then provides the descriptions.

According to an embodiment of the present disclosure, the server 122 receives the resource identifier, the URI for identifying the refrigerator 121 from the refrigerator 121, and stores the received resource identifier. A user may execute a predetermined application in the smart phone 120 to make a request to search for the refrigerator to the server 122. The server 122 may provide a list of refrigerators stored in the server 122 in response to the request for the search from the smart phone 120. The smart phone 120 displays the list of refrigerators provided from the server 122 on a screen thereof, and selects a refrigerator desired to be connected with in the displayed list of refrigerators. The list of refrigerators may include both the refrigerators connectable by Bluetooth and the refrigerators connectable by the Internet. Further, the list of refrigerators may include the URIs respectively corresponding to the plurality of refrigerators searched from the server 122.

If a user selects the refrigerator 121 desired to be connected with from the list of refrigerators displayed on the smart phone 120, the smart phone 120 may receive the URI of the selected refrigerator 121 from the server 122. The smart phone 120 creates the refrigerator access ID, which is shorter than the received URI and invariable, and transmits it to the refrigerator 121. If the refrigerator access ID transmitted to the refrigerator 121 is valid, that is, the transmitted refrigerator access ID is previously stored in the refrigerator 121, the refrigerator 121 informs the smart phone 120 that the refrigerator access ID is identified. Thus, the smart phone 120 is allowed access to the refrigerator 121, and thus controls the refrigerator 121 or receives data from the refrigerator 121.

According to an embodiment of the present disclosure, the URI for identifying each of the plurality of electronic apparatuses in the Internet-of-Things environment is registered to and stored in the server, and a user's electronic apparatus may receive the URI of the electronic apparatus desired to be connected with, by searching the server. Further, the URI received from the server is converted into the resource access ID which is shorter than the URI and invariable, and the resource access ID is transmitted to the electronic apparatus desired to be connected, thereby identifying the apparatus.

Figure 13:
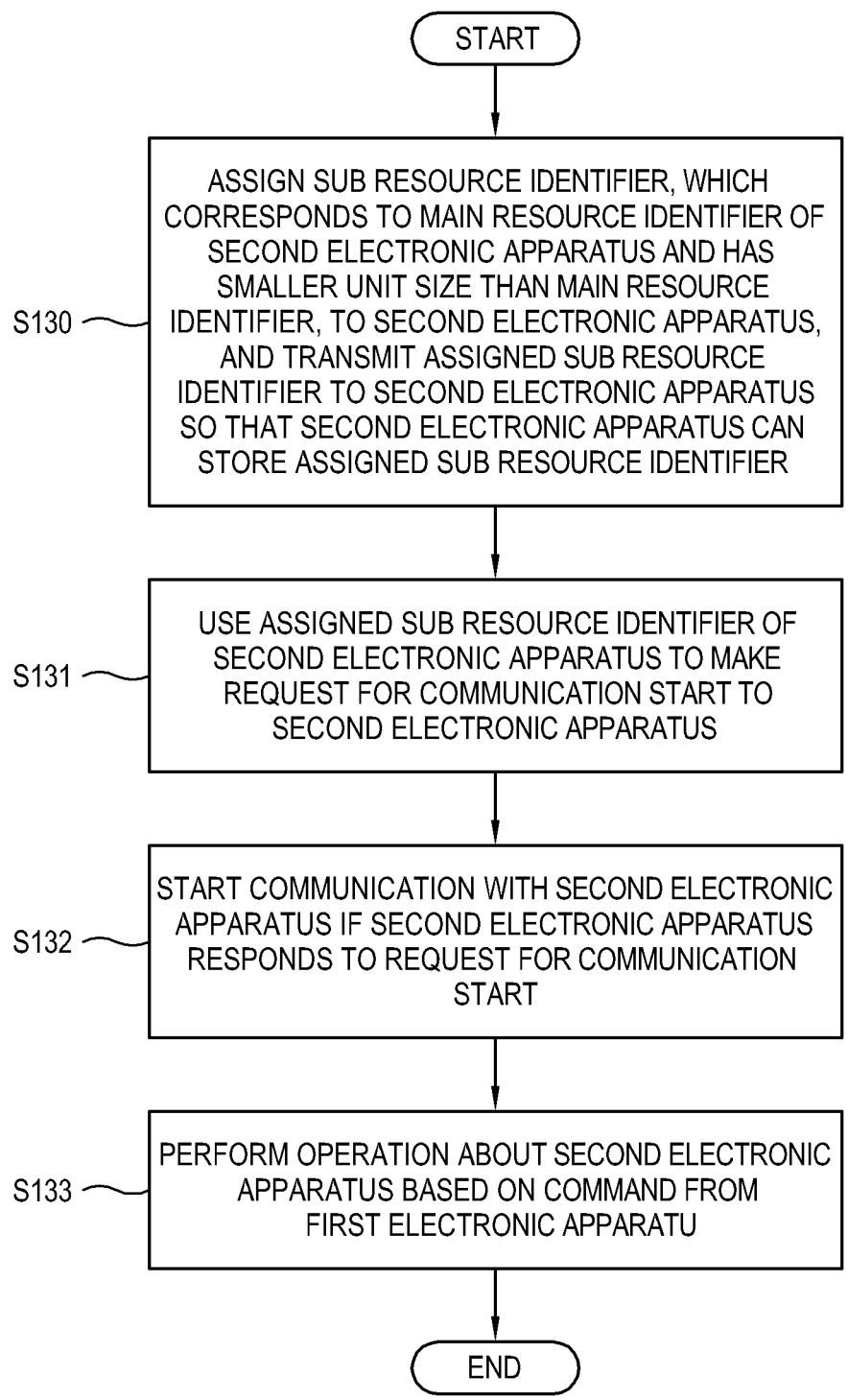
FIG. 13 is a flowchart of a method of controlling a first electronic apparatus according to an embodiment of the present disclosure.

FIG. 13 is a flowchart of a method of controlling a first electronic apparatus according to an embodiment of the present disclosure.

As shown in FIG. 13, at step S130, the sub resource identifier, which corresponds to the main resource identifier of the second electronic apparatus and has a smaller unit size than the main resource identifier, is assigned to the second electronic apparatus and sent to the second electronic apparatus so that the second electronic apparatus may store the sub resource identifier. According to an embodiment of the present disclosure, the main resource identifier may include the plurality of hierarchical items for indicating at least one of positions and functions of the plurality of electronic apparatuses in the Internet-of-Things environment. The sub resource identifier may be created corresponding to at least one among the plurality of hierarchical items involved in the main resource identifier. At step S130, a first electronic apparatus sends the main resource identifier to the second electronic apparatus and sends the sub resource identifier assigned to the second electronic apparatus.

At step S131, the sub resource identifier assigned to the second electronic apparatus is used to make a request for communication to the second electronic apparatus. Step S131 includes transmitting the assigned sub resource identifier to the second electronic apparatus. At step S132, if the second electronic apparatus responds to the request for communication then communication with the second electronic apparatus begins. At step S133, operations of the second electronic apparatus are performed based on a command from the first electronic apparatus.

Figure 14:
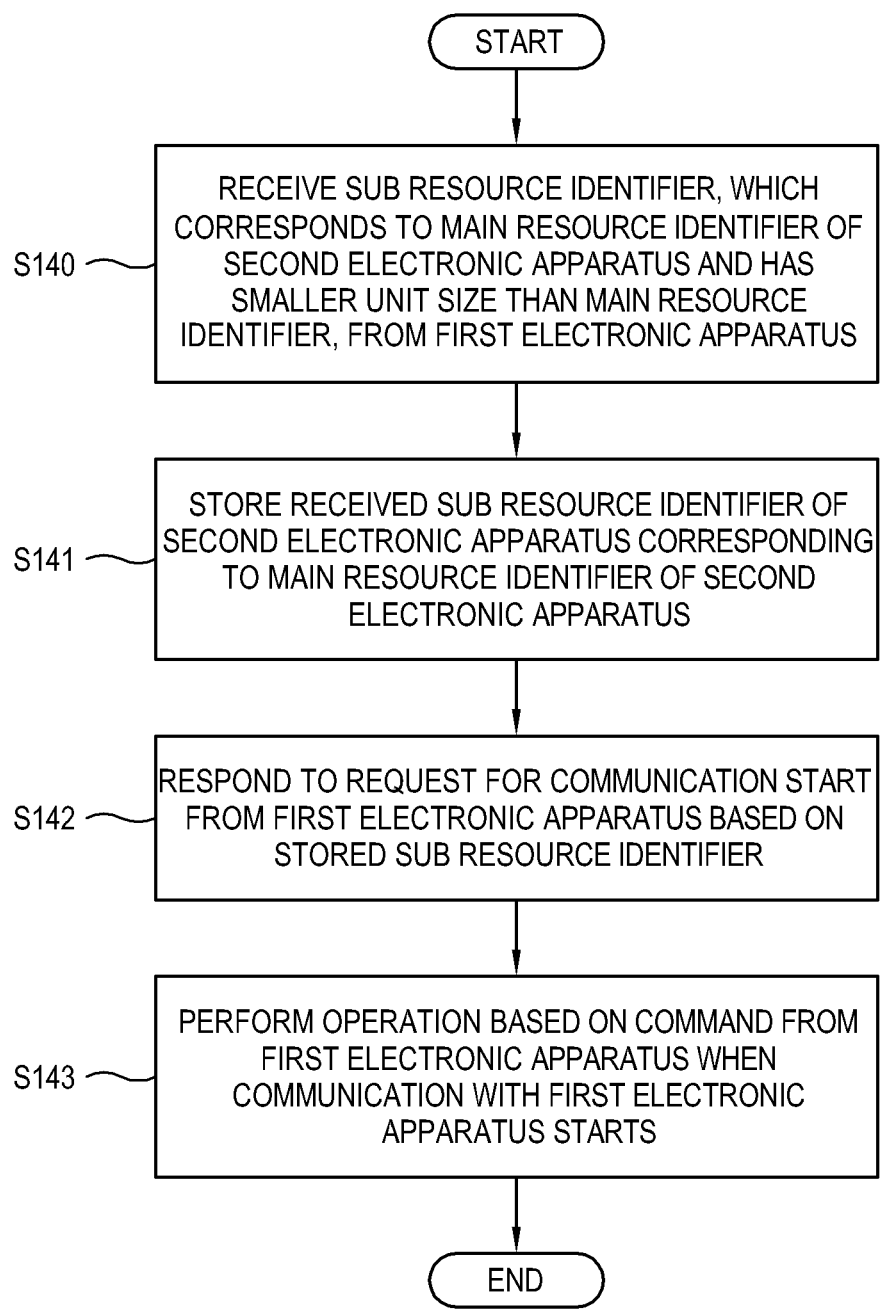
FIG. 14 is a flowchart of a method of controlling a second electronic apparatus according to an embodiment of the present disclosure.

FIG. 14 is a flowchart of a method of controlling a second electronic apparatus according to an embodiment of the present disclosure.

As shown in FIG. 14, at step S140, the sub resource identifier, which corresponds to the main resource identifier of the second electronic apparatus and has a smaller unit size than the main resource identifier, is received from the first electronic apparatus. At step S141, the received sub resource identifier of the second electronic apparatus is stored corresponding to the main resource identifier of the second electronic apparatus. At step S142, the second electronic apparatus responds to the request for communication from the first electronic apparatus, based on the stored sub resource identifier.

Step S142 may include receiving the assigned sub resource identifier of the second electronic apparatus from the first electronic apparatus, and informing the first electronic apparatus that communication is possible, if the received sub resource identifier has been previously stored. Step S142 may include informing the first electronic apparatus that the received sub resource identifier is invalid, if the received sub resource identifier has been not previously stored. At step S143, the second electronic apparatus performs operations based on a command from the first electronic apparatus.

Figure 15:
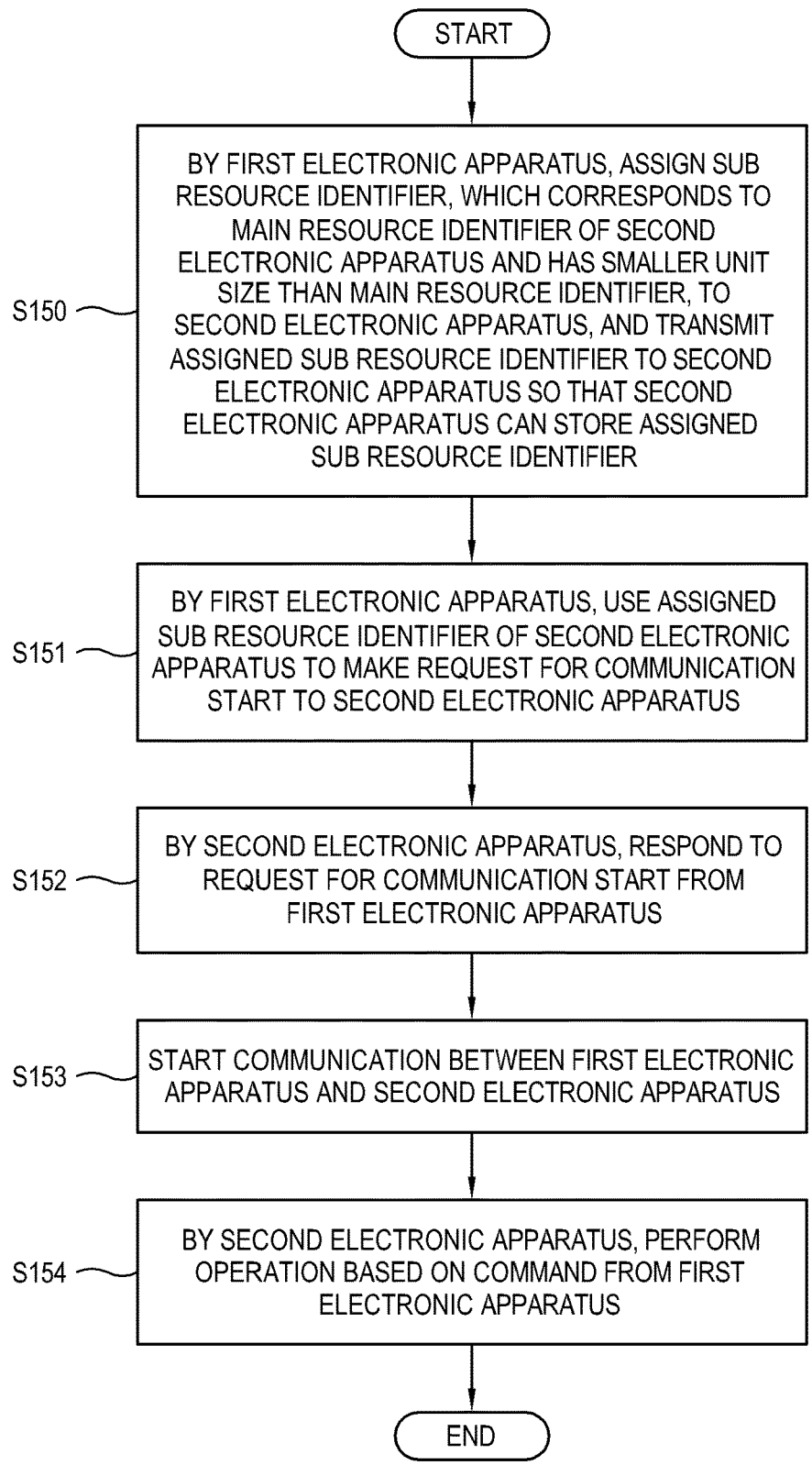
FIG. 15 is a flowchart of a method of controlling a system for the Internet-of-Things environment according to an embodiment of the present disclosure.

FIG. 15 is a flowchart of a method of controlling a system for the Internet-of-Things environment according to an embodiment of the present disclosure.

As shown in FIG. 15, at step S150, the first electronic apparatus assigns the sub resource identifier, which corresponds to the main resource identifier of the second electronic apparatus and has a smaller unit size than the main resource identifier, to the second electronic apparatus, and transmits the assigned sub resource identifier to the second electronic apparatus so that the second electronic apparatus may store the sub resource identifier. At step S151, the first electronic apparatus makes a request for communication to the second electronic apparatus, by the assigned sub resource identifier of the second electronic apparatus. Step S151 may include transmitting the assigned sub resource identifier to the second electronic apparatus.

At step S152, the second electronic apparatus responds to the request for communication from the first electronic apparatus. Step S152 may include receiving the assigned sub resource identifier of the second electronic apparatus from the first electronic apparatus, and informing the first electronic apparatus that communication is possible if the received sub resource identifier has been previously stored. Step S152 may also include informing the first electronic apparatus that the received sub resource identifier is not valid if the received sub resource identifier has been not previously stored.

At step S153 the first electronic apparatus begins communication with the second electronic apparatus, and at step S154 the second electronic apparatus performs operations based on a command from the first electronic apparatus.

FIG. 16 is a flowchart of a method of controlling a system for the Internet-of-Things environment according to another embodiment of the present disclosure.

As shown in FIG. 16, at step S160, the first electronic apparatus creates the sub resource identifier, which corresponds to the main resource identifier of the second electronic apparatus and has a smaller unit size than the main resource identifier. At step S161, the first electronic apparatus transmits the created sub resource identifier of the second electronic apparatus to the second electronic apparatus. At step S162, the second electronic apparatus determines whether the received sub resource identifier has been previously stored. If the received sub resource identifier has been previously stored, at step S163 the first electronic apparatus is informed that the second electronic apparatus is identified. If the received sub resource identifier has been not previously stored, at step S164 the first electronic apparatus is informed that the sub resource identifier is invalid.

According to another aspect of the present disclosure, a short and invariable resource identifier is used instead of a URI-based long and variable resource identifier when the plurality of electronic apparatuses communicate with each other in the Internet-of-Things environment, thereby decreasing the size of packets exchanged for communication between the electronic apparatuses. Further, it is also possible to improve data transfer efficiency between the electronic apparatuses.

According to another aspect of the present disclosure, a short and invariable resource identifier is used instead of a URI-based long and variable resource identifier when the plurality of electronic apparatuses communicate with each other in the Internet-of-Things environment, thereby having an effect on decreasing the size of packet exchanged for communication between the electronic apparatuses. Further, it is also possible to improve an efficiency of data transfer between the electronic apparatuses.

According to an embodiment of the present disclosure, the short and invariable resource identifier is used instead of the long and variable URI in the Internet-of-Things environment, thereby improving an efficiency of energy use and data transfer when a packet is transferred for resource access.

As described above, according to an embodiment of the present disclosure, a short and invariable resource identifier is used for identifying a plurality of electronic apparatuses in an Internet-of-Things environment, thereby decreasing use of energy in the electronic apparatus.

Further, according to an embodiment of the present disclosure, the short and invariable resource identifier is used for communication between the plurality of electronic apparatuses in the Internet-of-Things environment, thereby improving an efficiency of data transfer between the electronic apparatuses.

Although certain embodiments have been shown and described, it will be appreciated by those skilled in the art that changes may be made in these embodiments without departing from the spirit and scope of the present disclosure, as defined in the appended claims and their equivalents.

What is claimed is:

1. A first electronic apparatus, comprising:
a communicator configured to communicate with at least one among a plurality of electronic apparatuses respectively assigned main resource identifiers for identifying the plurality of electronic apparatuses over a network; and
a controller configured to:
assign a sub resource identifier to a second electronic apparatus among the plurality of electronic apparatuses, the sub resource identifier having a unit size that is smaller than a main resource identifier of the second electronic apparatus and which is an invariable size, wherein the main resource identifier comprises a plurality of hierarchical items and the sub resource identifier is assigned for each of the plurality of hierarchical items;
transmit the assigned sub resource identifier to the second electronic apparatus;
in response to a request of the second electronic apparatus for communication, perform communication with the second electronic apparatus using the assigned sub resource identifier of the second electronic apparatus; and
perform an operation based on the communication with the second electronic apparatus,
wherein the main resource identifier of the second electronic apparatus is stored in a server, and provided to the first electronic apparatus in response to a search request being made to the server.

2. The first electronic apparatus according to claim 1, wherein the controller is further configured to transmit the assigned sub resource identifier to the second electronic apparatus to request communication with the second electronic apparatus.

3. The first electronic apparatus according to claim 1, further comprising a storage,
wherein the controller is further configured to control the storage to store the main resource identifier of the second electronic apparatus and the sub resource identifier assigned to the second electronic apparatus.

4. The first electronic apparatus according to claim 1, wherein the main resource identifier comprises a plurality of hierarchical items indicating at least one of positions and functions of the plurality of electronic apparatuses.

5. The first electronic apparatus according to claim 4, wherein the sub resource identifier is created corresponding to at least one among the plurality of hierarchical items included in the main resource identifier.

6. A second electronic apparatus, comprising:
a communicator configured to communicate with at least one among a plurality of electronic apparatuses respectively assigned with main resource identifiers for identifying the plurality of electronic apparatuses over a network; and
a controller configured to:
receive a sub resource identifier assigned to the second electronic apparatus, the sub resource identifier having a unit size that is smaller than a main resource identifier of the second electronic apparatus and which is an invariable size, from a first electronic apparatus among the plurality of electronic apparatuses, wherein the main resource identifier comprises a plurality of hierarchical items and the sub resource identifier is assigned for each of the plurality of hierarchical items;
store the received sub resource identifier corresponding to the main resource identifier of the second electronic apparatus;
respond to a request for communication from the first electronic apparatus based on the stored sub resource identifier; and
perform an operation based on the communication with the first electronic apparatus when the communication with the first electronic apparatus begins,
wherein the controller is further configured to:
receive the sub resource identifier of the second electronic apparatus for requesting communication with the first electronic apparatus, and
inform the first electronic apparatus that the communication is possible when the received sub resource identifier has been previously stored.

7. The second electronic apparatus according to claim 6, wherein the controller is further configured to inform the first electronic apparatus that the received sub resource identifier is invalid when the received sub resource identifier has been not previously stored.

8. The second electronic apparatus according to claim 6, wherein the main resource identifier comprises a plurality of hierarchical items indicating at least one of positions and functions of the plurality of electronic apparatuses.

9. The second electronic apparatus according to claim 8, wherein the sub resource identifier is created corresponding to at least one among the plurality of hierarchical items included in the main resource identifier.

10. The second electronic apparatus according to claim 6, wherein the main resource identifier of the second electronic apparatus is stored in a server, and provided to at least one of the plurality of electronic apparatuses in response to a search request being made to the server.

11. A method of controlling a first electronic apparatus, the method comprising:
assigning a sub resource identifier to a second electronic apparatus among a plurality of electronic apparatuses assigned with main resource identifiers for identifying the plurality of electronic apparatuses over a network, the sub resource identifier having a unit size that is smaller than a main resource identifier of the second electronic apparatus and which is an invariable size, wherein the main resource identifier comprises a plurality of hierarchical items and the sub resource identifier is assigned for each of the plurality of hierarchical items;

transmitting the assigned sub resource identifier to the second electronic apparatus;
in response to a request of the second electronic apparatus for communication, performing communication with the second electronic apparatus using the assigned sub resource identifier of the second electronic apparatus; and
performing an operation based on the communication with the second electronic apparatus,
wherein the main resource identifier of the second electronic apparatus is stored in a server, and provided to the first electronic apparatus in response to a search request being made to the server.

12. The method according to claim 11, wherein requesting communication with the second electronic apparatus comprises transmitting the assigned sub resource identifier to the second electronic apparatus.

13. The method according to claim 11, further comprising:
storing, by the first electronic apparatus, the main resource identifier of the second electronic apparatus and the sub resource identifier assigned to the second electronic apparatus.

14. A method of controlling a second electronic apparatus, the method comprising:
receiving a sub resource identifier assigned to the second electronic apparatus, the sub resource identifier having a unit size that is smaller than a main resource identifier of the second electronic apparatus and which is an invariable size, from a first electronic apparatus among a plurality of electronic apparatuses respectively assigned with main resource identifiers for identifying the plurality of electronic apparatuses over a network, wherein the main resource identifier comprises a plurality of hierarchical items and the sub resource identifier is assigned for each of the plurality of hierarchical items;
storing the received sub resource identifier corresponding to the main resource identifier of the second electronic apparatus;
responding to a request for communication from the first electronic apparatus based on the stored sub resource identifier; and
performing an operation based on the communication with the first electronic apparatus when the communication with the first electronic apparatus begins,
wherein responding to the request for communication comprises:
receiving the sub resource identifier of the second electronic apparatus from the first electronic apparatus; and
informing the first electronic apparatus that communication is possible when the received sub resource identifier has been previously stored.

15. The method according to claim 14, further comprising:
informing the first electronic apparatus that the received sub resource identifier is invalid when the received sub resource identifier has been not previously stored.

16. A system for an Internet-of-Things environment, the system comprising:
a first electronic apparatus configured to:
assign a sub resource identifier to a second electronic apparatus among a plurality of electronic apparatuses assigned with main resource identifiers for identifying the plurality of electronic apparatuses over a network, the sub resource identifier having a unit size that is smaller than a main resource identifier of the second electronic apparatus and which is an invariable size, wherein the main resource identifier comprises a plurality of hierarchical items and the sub resource identifier is assigned for each of the plurality of hierarchical items,
transmit the assigned sub resource identifier to the second electronic apparatus,
in response to a request of the second electronic apparatus for communication, perform communication with the second electronic apparatus using the assigned sub resource identifier of the second electronic apparatus, and
issue a command to the second electronic apparatus; and
the second electronic apparatus configured to:
receive the sub resource identifier assigned to the second electronic apparatus from the first electronic apparatus,
store the received sub resource identifier corresponding to the main resource identifier of the second electronic apparatus,
respond to a request for communication from the first electronic apparatus based on the stored sub resource identifier, and
perform an operation based on the communication with the first electronic apparatus when communication with the first electronic apparatus begins,
wherein the second electronic apparatus is further configured to:
receive the sub resource identifier of the second electronic apparatus for requesting communication with the first electronic apparatus, and
inform the first electronic apparatus that the communication is possible when the received sub resource identifier has been previously stored.

17. A method of controlling a system for an Internet-of-Things environment, the method comprising:
assigning, by a first electronic apparatus among a plurality of electronic apparatuses assigned with main resource identifiers for identifying the plurality of electronic apparatuses over a network, a sub resource identifier to a second electronic apparatus, the sub resource identifier having a unit size that is smaller than a main resource identifier of the second electronic apparatus and which is an invariable size, wherein the main resource identifier comprises a plurality of hierarchical items and the sub resource identifier is assigned for each of the plurality of hierarchical items;
transmitting the assigned sub resource identifier to the second electronic apparatus;
using the assigned sub resource identifier of the second electronic apparatus to request communication with the second electronic apparatus, by the first electronic apparatus;
responding to the request for communication from the first electronic apparatus, by the second electronic apparatus;
beginning communication between the first electronic apparatus and the second electronic apparatus; and
performing an operation based on the communication with the first electronic apparatus, by the second electronic apparatus,
wherein responding to the request for communication comprises:
receiving the sub resource identifier of the second electronic apparatus from the first electronic apparatus; and informing the first electronic apparatus that communication is possible when the received sub resource identifier has been previously stored.

* * * * *